(12) United States Patent
Liu

(10) Patent No.: US 8,887,902 B1
(45) Date of Patent: Nov. 18, 2014

(54) MOBILE DEVICE ENCLOSURE SYSTEM

(71) Applicant: Warren Liu, Chino, CA (US)

(72) Inventor: Warren Liu, Chino, CA (US)

(*) Notice: Subject to any disclaimer, the term of this patent is extended or adjusted under 35 U.S.C. 154(b) by 0 days.

(21) Appl. No.: 14/203,540

(22) Filed: Mar. 10, 2014

Related U.S. Application Data

(63) Continuation-in-part of application No. 13/958,392, filed on Aug. 2, 2013, now Pat. No. 8,708,140.

(60) Provisional application No. 61/678,941, filed on Aug. 2, 2012.

(51) Int. Cl.
*B65D 85/00* (2006.01)

(52) U.S. Cl.
USPC .................. 206/45.23; 206/320; 206/473

(58) Field of Classification Search
USPC .......... 206/45.2, 45.23, 45.24, 576, 472, 473, 206/701, 722, 320
See application file for complete search history.

(56) References Cited

U.S. PATENT DOCUMENTS

| | | | |
|---|---|---|---|
| 8,708,140 B2 * | 4/2014 | Liu | 206/45.23 |
| 2011/0203954 A1 * | 8/2011 | Kroupa | 206/320 |
| 2013/0126372 A1 * | 5/2013 | Song | 206/320 |
| 2013/0264235 A1 * | 10/2013 | Lin | 206/320 |

* cited by examiner

*Primary Examiner* — Jacob K Ackun

(57) ABSTRACT

A mobile device enclosure system is an apparatus system that protects a mobile device from the wear and tear associated with of daily usage without limiting the portability of the mobile device or the accessibility of said mobile device's hardware keys or charging ports. The apparatus system accomplishes this through the use of an inner case and an outer case. The inner case is enclosed within the outer case. The inner case partially surrounds the mobile device and functions as an attachment means for mounting to the outer case. The outer case houses both the inner case and the mobile device protecting them from accidental damage. The inner case is rotatably coupled to the outer case permitting the mobile device to be particularly oriented and positioned in order to enable facilitated viewing of the mobile device's display screen.

18 Claims, 18 Drawing Sheets

MOBILE DEVICE ENCLOSURE SYSTEM

The current application is a continuation-in-part of and claims priority to the U.S. patent application Ser. No. 13/958, 392 filed on Aug. 2, 2013, which claims a priority to U.S. Provisional Patent application Ser. No. 61/678,941 filed on Aug. 2, 2012.

FIELD OF THE INVENTION

The present invention relates generally to an apparatus enclosure, more specifically to a mobile device enclosure that is configurable in a manner that allows for various viewable orientations of the enclosed mobile device while additionally providing protection form wear and tear.

BACKGROUND OF THE INVENTION

With the advent of new technology, people have become more reliant on mobile devices to enhance and facilitate their daily activities. Many of these mobile devices, such as tablet PCs, combine the function of several electronic devices into a singular device with a wide range of functionality. While these mobile devices have become essential for managing the daily lives of many people, their daily usage will oftentimes cause wear and tear on the device itself. In most situations, the signs of wear are merely cosmetic but if a user were to drop the device, irreparable damage can be caused the mobile device. This can oftentimes lead to expensive repair costs but more commonly will result in the device having to be completely replaced.

Although there exist several systems and methods for protecting these mobile devices from normal wear and tear and accidental damage, these systems often times limit the functionality of the mobile device. These existing system are generally designed to be external enclosures that envelope the mobile device, functioning as a protective barriers. The disadvantage with these systems is that they generally end up limiting the portability of the mobile device as well as the accessibility of charging ports and hardware keys. Furthermore, these existing systems make it difficult to utilize the mobile devices in alternative capacities, such as a stand along touch screen keyboards and viewing platforms due to the protective cover enclosing particular design features of the mobile device.

It is therefore the object of the present invention, to provide a mobile device enclosure system that is able to protect a mobile device from the wear and tear of daily usage without limiting the portability of the mobile device or the accessibility of said mobile device's hardware keys or charging ports. The present invention accomplishes this through the use of an inner case and an outer case. The inner case is enclosed within the outer case. The inner case surrounds and functions as a vehicle for mounting the mobile device to the outer case. The outer case houses both the inner case and the mobile device protecting them from accidental damage. The inner case is rotatably coupled to the outer case permitting the mobile device to be particularly oriented and positioned in order to enable facilitated viewing of the mobile device's display screen.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
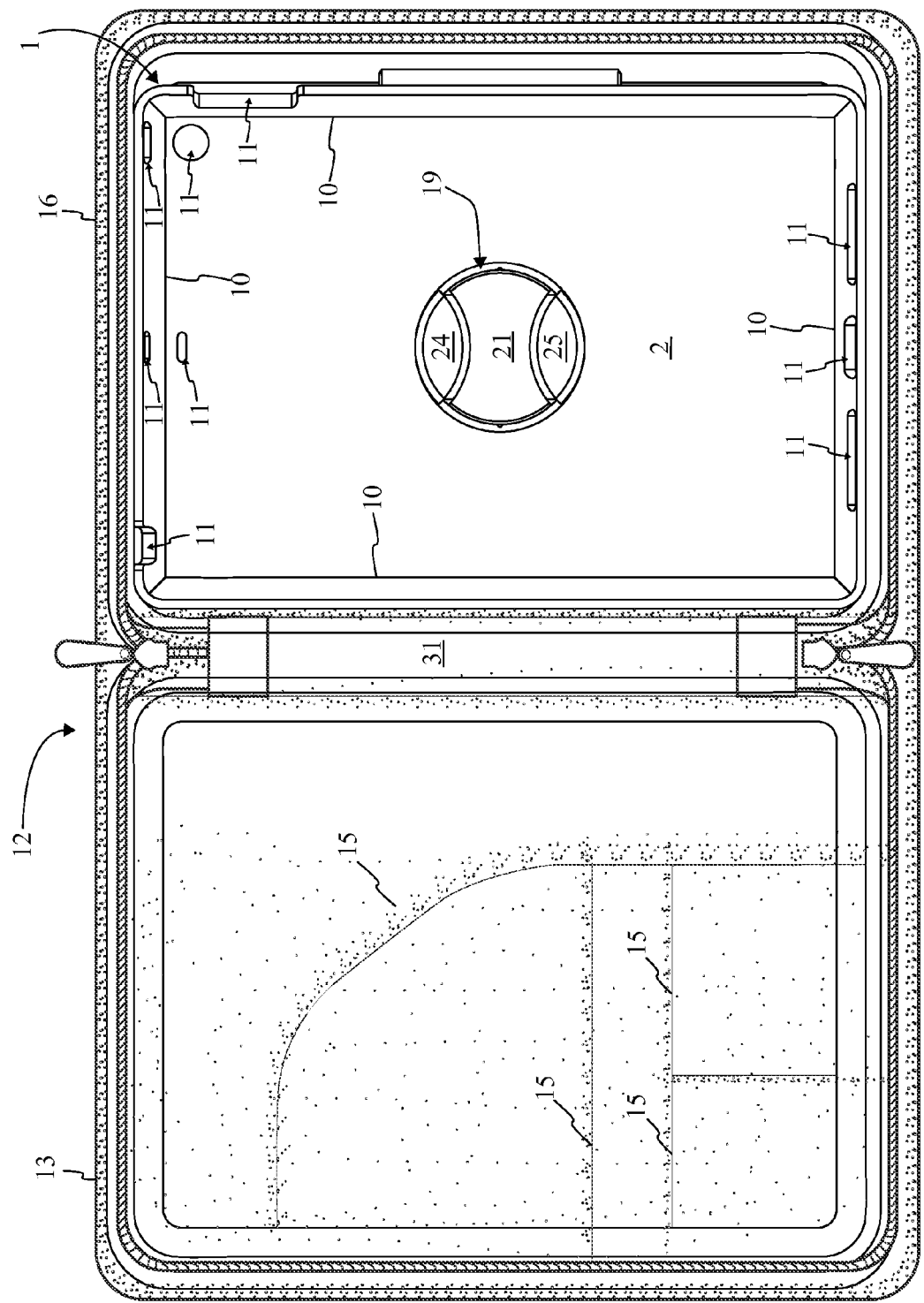
FIG. 1 is a top elevational view displaying the mobile device enclosure system in the clam shell configuration with the inner case attached to the outer case.

Referencing FIG. 1, the present invention is a mobile device enclosure system that protects a mobile device for the wear and tear associated with everyday usage without limiting said mobile device's portability or inhibiting access to said mobile device's hardware keys and charging ports. In the current embodiment of the present invention, the mobile device enclosure system comprises an inner case 1, an outer case 12, and an inner case coupler 19. The inner case 1 is a semi-rigid shell that couples to a mobile device without obstructing said mobile device's display screen or associated ports. The inner case 1 serves as an intermediary component enabling the mobile device to be rotatably attached to the inner case coupler 19. The inner case coupler 19 is pivotably coupled to the outer case 12. The outer case 12 forms a protective exterior for the mobile device while additionally providing features facilitating media viewing by a user.

Referencing FIG. 1 and FIG. 4-6, the inner case 1 peripherally engages a mobile device and covers the rear portion of the mobile device opposite its display screen. The inner case 1 detachably and rotatably engages the inner case coupler 19 enabling the enclosure and rotation to the outer case 12. In the current embodiment of the present invention, the inner case 1 comprises a rear panel 2, a case mount 5, sidewalls 10, and a plurality of port openings 11. The rear panel 2 is a flat section of the inner case 1 that rests against the rear portion of a mobile device. The rear panel 2 is formed to the specific shape of the rear portion of a mobile device. The sidewalls 10 are semi rigid structures peripherally positioned to the rear panel 2. The sidewalls 10 are particularly formed to laterally engage a mobile device without obstructing the display screen. The sidewalls 10 retain the mobile device within the inner case 1. The case mount 5 is a structural feature that detachably and rotatably engages the inner case coupler 19. The case mount 5 is centrally positioned on the rear panel 2. The plurality of port openings 11 are particularly excised regions of the sidewalls 10 and the rear panel 2 that provide access to the functionally important ports and hardware keys of a mounted mobile device.

Referencing FIG. 4-7, the rear panel 2 rests against the rear portion of a mobile device. The sidewalls 10 are positioned perimetrically around the rear panel 2. The sidewalls 10 extend generally perpendicularly to the rear panel 2, wherein the sidewalls 10 extend in away from the rear panel 2 but curve to form the particular contours allowing engagement with lateral regions of a mobile device. The case mount 5 is found centrally positioned on the rear panel 2, wherein the central positioning of the case mount 5 with the rear panel 2 assists in the balance of the inner case 1 when coupled to the inner case coupler 19. In the current embodiment of the present invention, the rear panel 2 comprises at least one kickstand 3 and a hand strap 4. The at least one kickstand 3 and the hand strap 4 provide additional functionality to the inner case 1.

Referencing FIG. 3-8, the rear panel 2 is provided with an interior face side and an exterior face side. The interior face side of the rear panel 2 is coincident with the rear portion of the mobile device. The exterior face side of the rear panel 2 is adjacent with the inner case coupler 19, while the inner case 1 is enclosed within the outer case 12. The at least one kickstand 3 and the hand strap 4 are found positioned on the exterior face side of the rear panel 2. The at least one kickstand 3 and the hand strap 4 are not recessed into the exterior face side of the rear panel 2 resulting in the both the at least one kickstand 3 and the hand strap 4 being slightly raised. The hand strap 4 is provided as a mean of securing the inner case 1 to a user's hand facilitating the carrying, transportation, and handling of the mobile device with one hand. The hand strap 4 is found positioned opposite the at least one kickstand 3 across the positioning of the case mount 5. The at least one kickstand 3 allows the inner case 1 to be angled when rested on the rear panel 2. The angled positioning allows the mobile device mounted in the inner case 1 to operate as a keyboard. The at least one kickstand 3 is pivotably coupled to the rear panel 2. In the preferred embodiment of the present invention, the at least one kickstand 3 comprises two kickstands 3 operatively distributed on the rear panel 2 to facilitate the deployment of the inner case 1 in its angled configuration.

Figure 6:
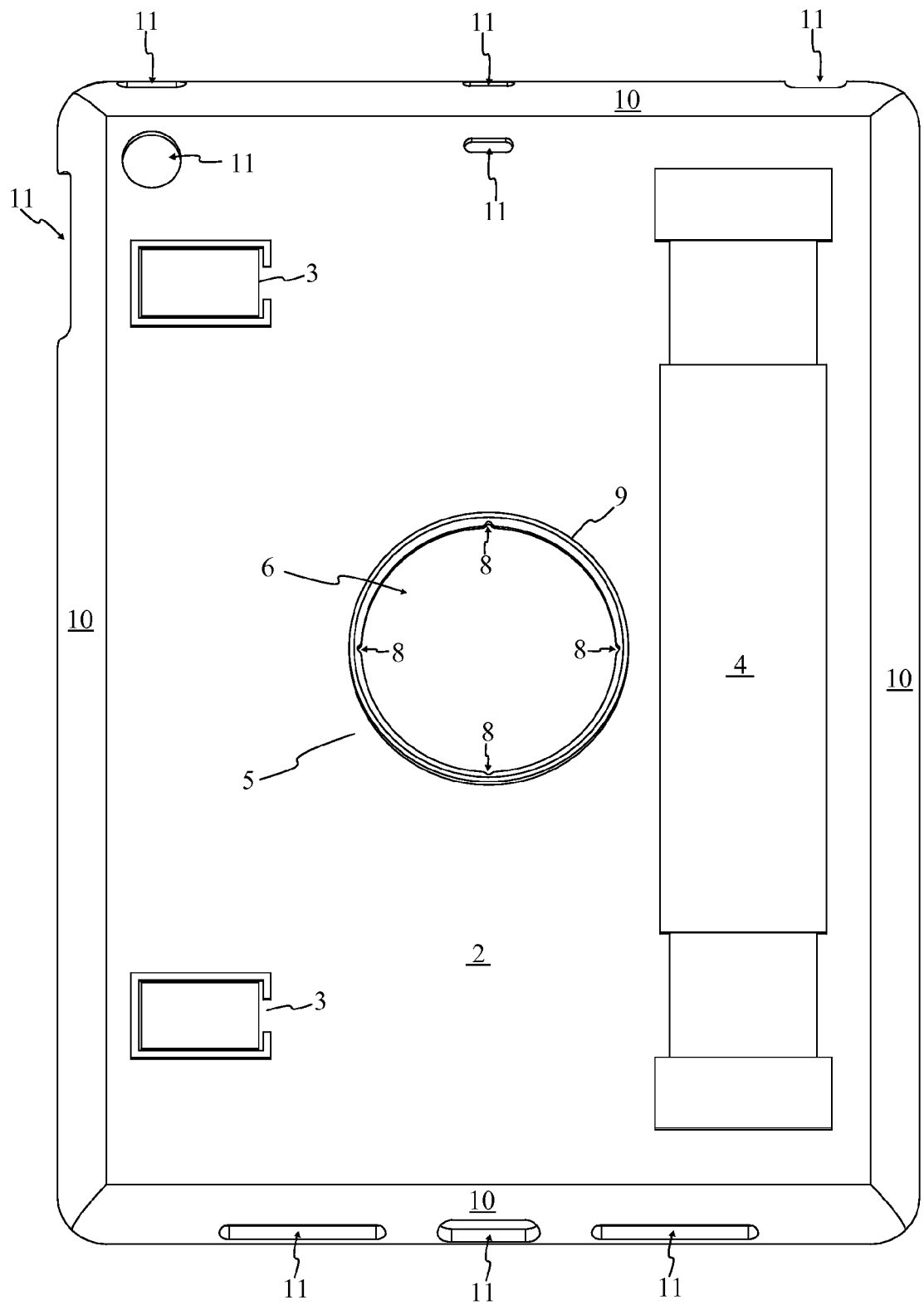
FIG. 6 is a perspective view displaying the rear portion of the inner case as per the current embodiment of the present invention.

Referencing FIG. 6, the sidewalls 10 are structural elements that enable the engagement of the inner case 1 with the lateral portions of a mobile device. The sidewalls 10 are perimetrically positioned on the rear panel 2, wherein the sidewalls 10 are positioned around the exterior perimeter of the rear panel 2. The sidewalls 10 extend generally perpendicularly to the rear panel 2, wherein the sidewalls 10 extend in away from the rear panel 2 but curve to form the particular contours allowing engagement with lateral regions of a mobile device. In an embodiment of the present invention, the sidewalls 10 comprise integrated couplers that are particularly positioned on the sidewalls 10. The integrated couplers facilitate the secure retention of a mobile device to the inner case 1. The positioning of the integrated couplers is relative to the sidewalls 10 and mainly dependent on a coincident positioning with a mobile device.

Figure 4:
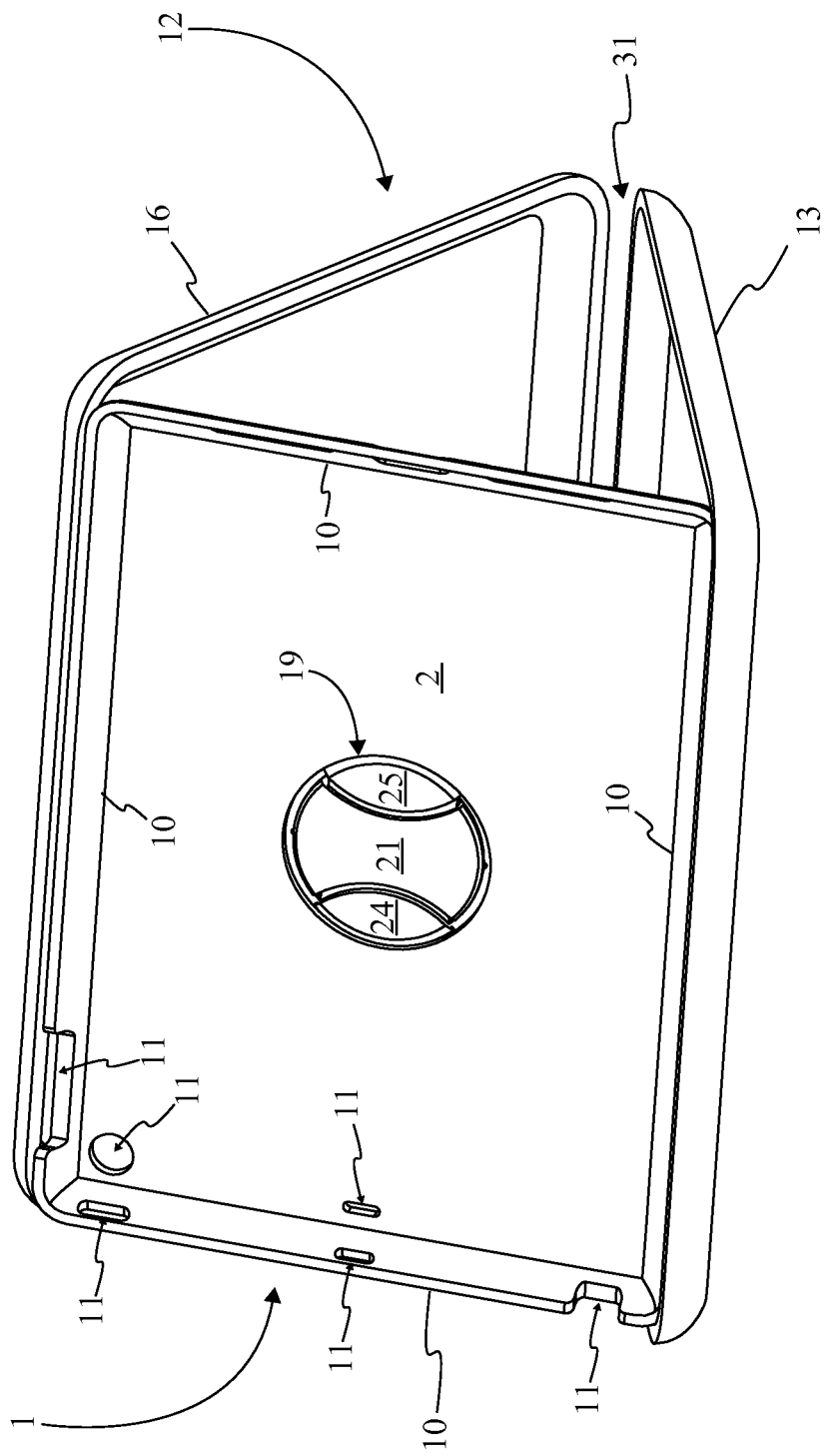
FIG. 4 is a perspective view displaying a representation of the mobile device enclosure system in the clam shell configuration angled for viewing with the inner case attached in a landscape view.
Figure 5:
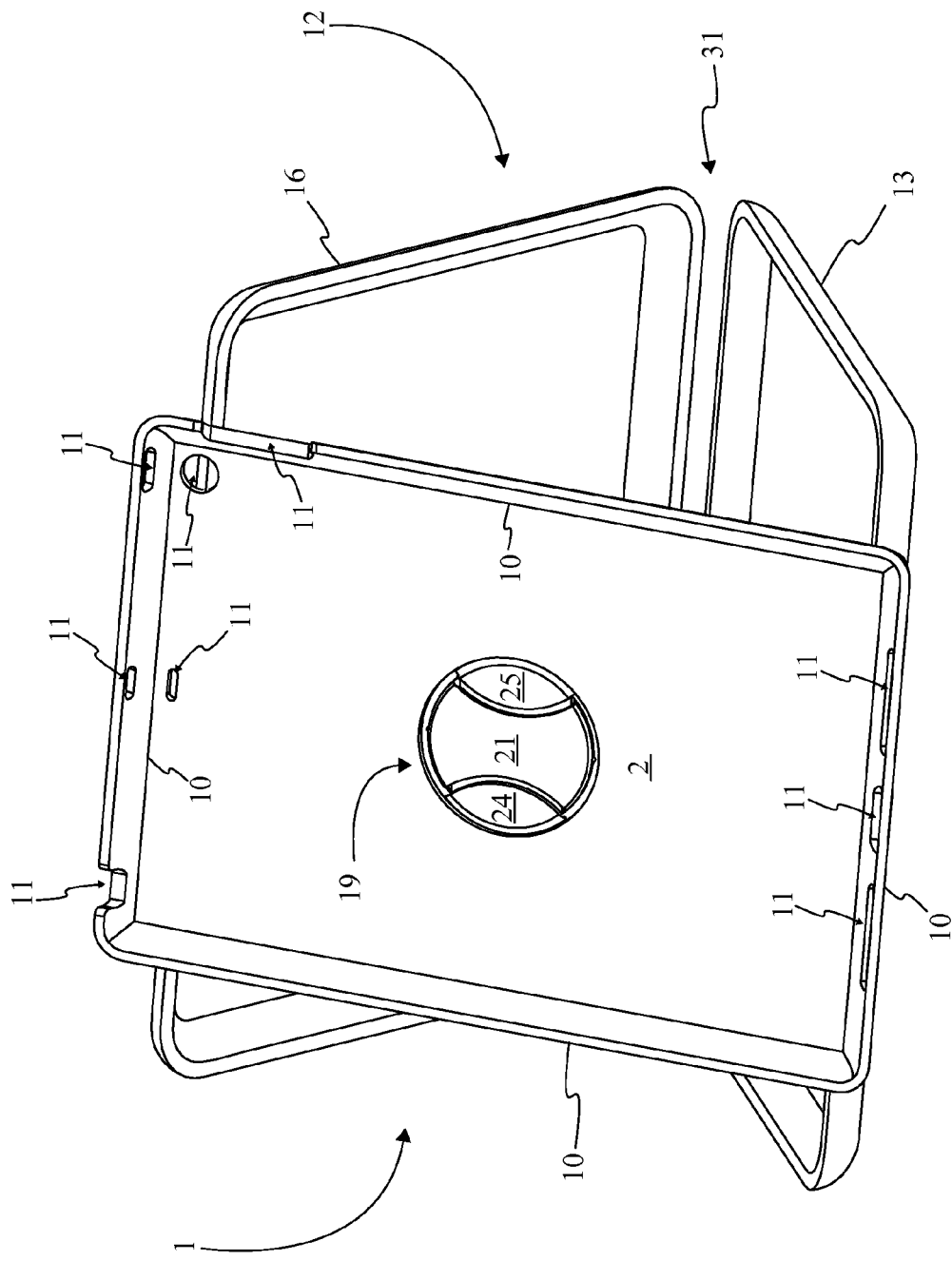
FIG. 5 is a perspective view displaying a representation of the mobile device enclosure system in the clam shell configuration angled for viewing with the inner case attached in a portrait view.

Referencing FIG. 4-6, the plurality of port openings 11 are particularly excised regions of the sidewalls 10 and the rear panel 2 that provide access to the functionally important ports and hardware keys of a mounted mobile device. The positioning of the plurality of port openings 11 is coincident with power and audio ports as well as hardware keys. The particular positioning of the plurality of port openings 11 is dependent on the particular placement of a mobile device's ports and hardware keys. The plurality of port openings 11 are voided spaces of the sidewalls 10 or the rear panel 2 that become coincident with the particular placement of a specific mobile device's ports and/or hardware keys.

Referencing FIG. 6-9, the case mount 5 is the structural component that enables a detachable and rotatable engagement between the inner case 1 and the inner case coupler 19. The case mount 5 is found positioned centrally on rear panel 2. The positioning of the case mount 5 on the rear panel 2 provides balance to the inner case 1 when coupled to the inner case coupler 12. In the current embodiment of the present invention the case mount 5 comprises an opening 6, a flange 7, at least two notch mounts 8, and a beveled rim 9. The opening 6 is a voided space that is traversed by a complementary component of the inner case coupler 19 utilized to detachably engage the inner case 1. The beveled rim 9 is an angled surface positioned adjacent to the flange 7 that facilities the traversal and engagement of inner case coupler 19 with the case mount 5. The flange 7 is a structural peripherally positioned around the opening 6. The flange 7 engages the inner case coupler 19 retaining the inner case 1 but permitting a rotatable engagement. The at least two notch mounts 8 are oppositely positioned mounting points that traverse both the flange 7 and the beveled rim 9. The at least two notch mounts 8 are utilized to secure the inner case 1 in a particular alignment while mounted with the inner case coupler 19.

Referencing FIG. 6-9, the opening 6 serves as an entry point for components of an inner case coupler 19 namely a housing 21, a first coupler 24, and a second coupler 25 that detachably and rotatably engage the case mount 5. The opening 6 is a voided space that traverses centrally through the rear panel 2. The opening 6 traverses centrally through the case mount 5 which subsequently provides the opening 6 with a central positioning on the rear panel 2. The positioning of the opening 6 provides even weight distribution to the inner case 1 when engaged to the inner case coupler 19.

Referencing FIG. 6-9, the flange 7 is an internal ridge that is provided as a retention point for securing the inner case coupler 19 to the case mount 5. The flange 7 is coincidentally engaged by complementary elements of the first coupler 24 and the second coupler 25, securing the inner case coupler 19 to the case mount 5 in a particular position. The flange 7 is peripherally positioned around the opening 6 and extends centrally into the opening 6. The flange 7 is positioned immediately adjacent to the beveled rim 9. The beveled rim 9 is a structural element that facilitates the traversal of the first coupler 24 and the second coupler 25 through the opening 6 and subsequently facilitates the engagement of the first coupler 24 and the second coupler 25 with the flange 7. The flange 7 and the beveled rim 9 both share a central alignment with the opening 6. While the flange 7 is positioned peripherally around the interior of the opening 6, the beveled rim 9 is positioned coincident with the exterior surface of the rear panel 2 and partially extends into the opening 6 becoming coincident with the flange 7. The beveled rim 9 is engaged by the inner case coupler 19 and is utilized to retain the first coupler 24 and the second coupler 25 against the flange 7. The beveled rim 9 comprises a chamfered edge. the chamfered edge is the angled portion of the beveled rim 9 that facilitates the traversal of the first coupler 24 and the second coupler 25. The chamfered edge has a bias towards the interior surface of the rear panel 2, wherein the angle of the chamfered edge slopes towards the interior surface facilitating traversal of the first coupler 24, the second coupler 25, and the housing 21 directionally towards the interior surface of the rear panel 2.

Referencing FIG. 6-9, the at least two notch mounts 8 are formed indents that secure the first coupler 24 and the second coupler 25 to the case mount 5. The at least two notch mounts 8 become coincident with a notch 26 of the first coupler 24 and another notch 26 of the second coupler 25. In order to accomplish this engagement the at least two notch mounts 8 are found peripherally positioned to the opening 6. The at least two notch mounts 8 accomplish this positioning by traversing through the flange 7 and the beveled rim 9. Each notch mount 8 of the at least two notch mounts 8 are positioned oppositely across the opening 6. Referencing FIG. 4-5 and FIG. 16-17, the opposite positioning of each notch mount 8 of the at least two notch mounts 8 ensure at least two secure alignments for the inner case 1 when mounted to the outer case 12.

Referencing FIG. 1-5 and FIG. 12-17, the outer case 12 is a protective exterior for the mobile device that additionally provides features facilitating media viewing by a user. The outer case 12 encloses the inner case 1. The inner case coupler 19 is pivotably coupled to the outer case 12. The engagement between the outer case 12 and the inner case coupler 19 provides a detachable and rotatable mounting point for the inner case 1. In the current embodiment of the present invention, the outer case 12 comprises a first flap 13, a second flap 16, and a folding region 31. The first flap 13 is the portion of the outer case 12 that folds over the inner case 1 becoming adjacently positioned to the display screen of the mobile device. The second flap 16 is the portion of the outer case 12 that is mostly adjacent to the rear panel 2 of the inner case 1. The second flap 16 provides a pivotable mounting point for the inner case coupler 19. The first flap 13, the second flap 16, and the folding region 31 peripherally surround the inner case 1. The folding region 31 is an area of the outer case 12 that is comparatively more flexible than both the first flap 13 and the second flap 16. The folding region 31 functions as a hinge for the outer case 12 allowing the first flap 13 and the second flap 16 to fold between an open position and a closed position. The open position is observed when the first flap 13 and the second flap 16 are positioned generally coplanar to one another. The closed position is observed when the first flap 13 and the second flap 16 are positioned mostly parallel where the first flap 13 is found oppositely positioned to the second flap 16 across the inner case 1.

Figure 2:
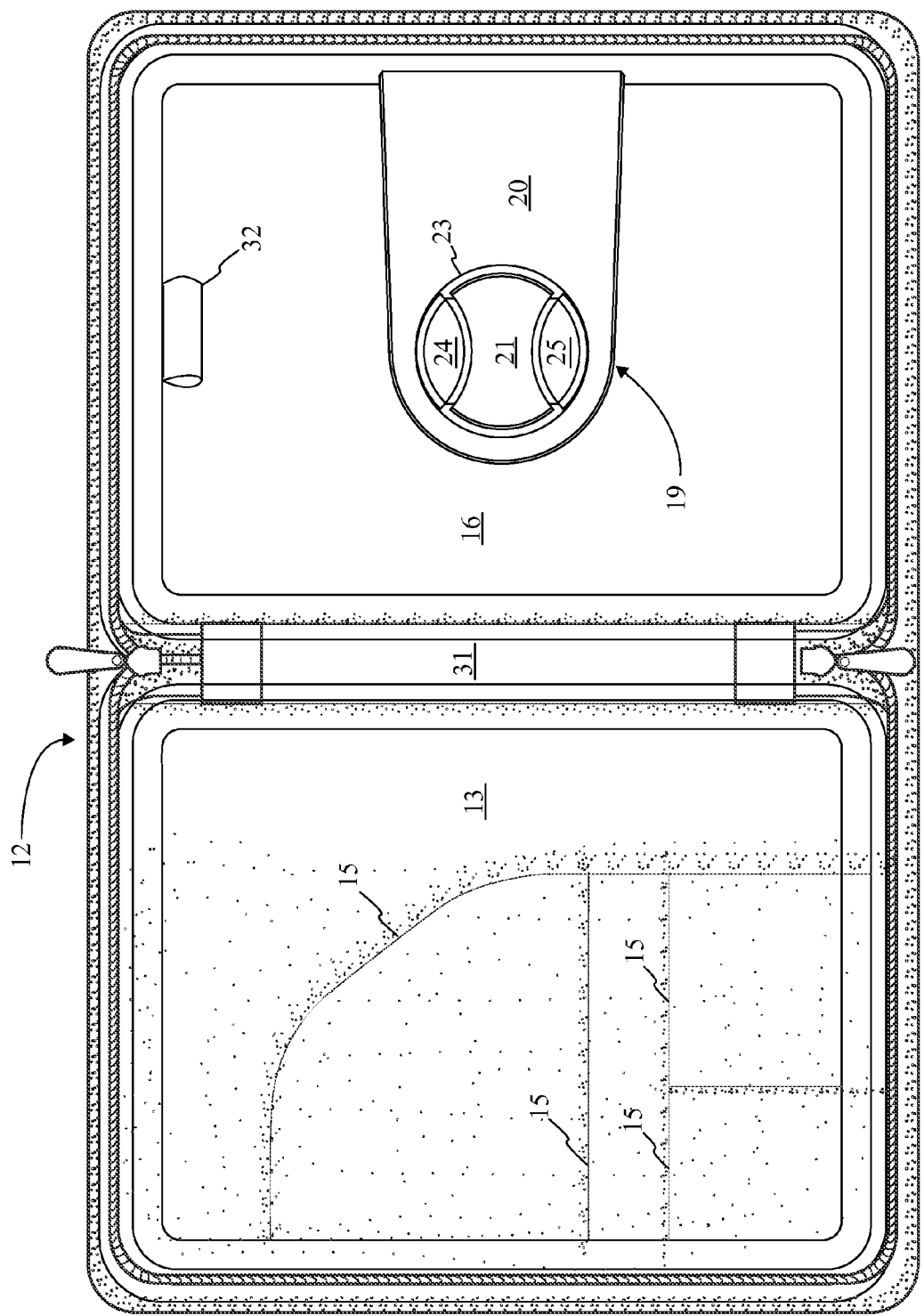
FIG. 2 is a top elevational view displaying the mobile device enclosure system in the clam shell configuration without the inner case attached to the outer case.
Figure 3:
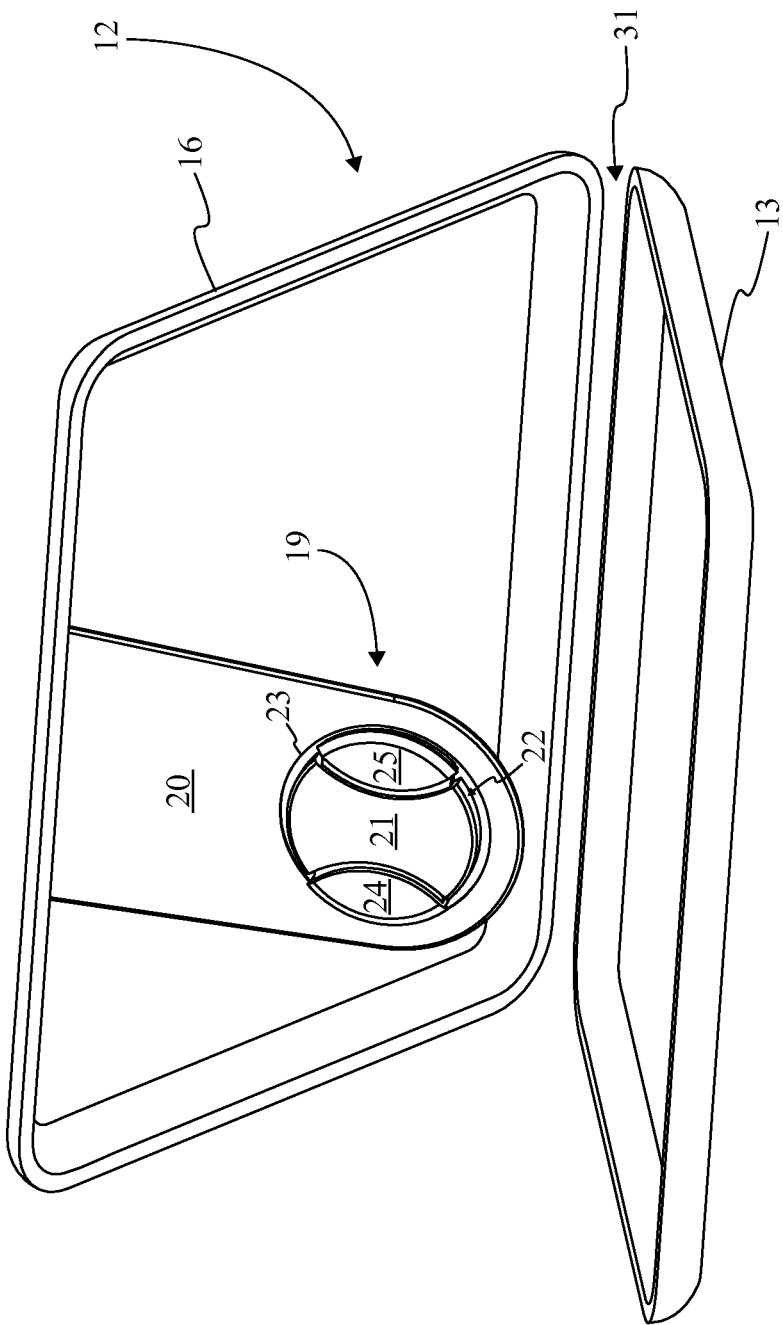
FIG. 3 is a perspective view displaying a representation of the mobile device enclosure system in the clam shell configuration angled for viewing without the inner case attached to the outer case.

Referencing FIG. 2, in an embodiment of the present invention, the outer case 12 comprises a plurality of accessory mounts 32. The plurality of accessory mounts 32 are particularly positioned on the outer case 12 in a manner that does not interfere with its functionality. The plurality of accessory mounts 32 provide a user with a particular engagement to connect specific accessory associated with a mobile device. The specific accessories can include a stylus or a memory card.

Referencing FIG. 14-17, in an embodiment of the present invention, the outer case 12 comprises accessory openings 18. The accessory openings 18 are particularly excised regions of the outer case 12 that are coincidentally aligned with port openings 11 of the plurality of port openings 11. The accessory openings 18 provide access to the functionally important ports and hardware keys of a mounted mobile device. The positioning of the accessory openings 18 coincides with the plurality of port openings 11 in order to allow access to power and audio ports as well as hardware keys while the mobile device is enclosed within the outer case 12.

Referencing FIG. 1-5 and FIG. 12-17, the first flap 13 is the pivotably coupled to the second flap 16 by way of the folding region 31. The folding region 31 serves as a hinge allowing the first flap 13 and the second flap 16 to fold into an open position and a closed position, as well as intermediate positions that enables the outer case 12 to function as a media viewing stand while a mobile device is coupled. Referencing FIG. 1 and FIG. 2, in the current embodiment of the present invention the first flap 13 contains a plurality of accessory pockets 15 that allow a user to easily store accoutrements for the mobile device such as, charging cables or screen wipes, but can additionally provide a quick storage location for business cards or other items.

Referencing FIG. 13-17, in an embodiment of the present invention, the first flap 13 comprises an inner case retainer 14. The inner case retainer 14 is a mount or a non-slip surface that becomes coincident with the inner case 1 while it is engaged to the inner case coupler 19. Due to the pivotable engagement of the inner case coupler 19 to the second flap 16 the inner case 1 is able to be secured with a particular angular positioning that facilitates viewing of media on the mobile device's display screen. The inner case retainer 14 is a detachable engagement that reduces unwanted obstruction to the display screen. It should be noted that the inner case retainer 14 can be incorporated into a clam shell case configuration and a folding book configuration of the outer case 12.

Referencing FIG. 2-3, FIG. 7-11, and FIG. 14-15, the inner case coupler 19 is provided as a means of rotatably and detachably engaging the case mount 5 of the inner case 1. The inner case coupler 19 is found pivotably coupled to the second flap 16. The pivotable coupling of the inner case coupler 19 to the second flap 16 allows the inner case coupler 19 to pivot at different angles enabling the repositioning of an engaged inner case 1 in order to facilitate viewing of the display screen. In the current embodiment of the present invention, the inner case coupler 19 comprises a tab 20, a housing 21, a first coupler 24, and a second coupler 25. The tab 20 is provided as a means of pivotably connecting the housing 21 to the second flap 16. The housing 21 is a structure that is integrally coupled to the tab 20 that provides a mounting point for the first coupler 24 and the second coupler 25. The first coupler 24 and the second coupler 25 are symmetrically positioned across the housing 21 and function as the detachable engagement means for securing the case mount 5 to the inner case coupler 19.

Referencing FIG. 2-3, FIG. 7-11, and FIG. 14-15, the tab 20 is the portion of the inner case coupler 19 that provides a mounting point for the housing 21. The tab 20 is integrally coupled to the housing 21 securing the housing 21 in particular arrangement while preventing unwanted movement that would affect the functionality of the inner case coupler 19. The tab 20 is pivotably coupled to the second flap 16. The engagement point of the second flap 16 to the tab 20 is found positioned distal to the folding region 31 of the outer case 12, wherein the pivot point between the tab 20 and the second flap 16 is found opposite the folding region 31 across the second flap 16.

Referencing FIG. 14-17, in an embodiment of the present invention the tab 20 is pivotably coupled to the second flap 16 by way of a folding panel 17. The folding panel 17 is a pivotable portion of the second flap 16 that is positioned opposite the folding region 31 across the second panel. The folding panel 17 is provided as being coplanar to the tab 20. the coplanar positioning provides the tab 20 with a smaller profile that reduces the required size of the outer case 12. It should be noted that the folding panel 17 is a component associated with the folding book configuration of the present invention.

Referencing FIG. 7-11, the housing 21 is a structural feature that traverses the opening 6 of the case mount 5. The housing 21 serves as a mounting point for the first coupler 24 and the second coupler 25. the housing 21 is integrally coupled to the tab 20, wherein the integral coupling of to the tab 20, provides the housing 21 with a pivotable positioning relative to the second flap 16 while preventing unwanted movement that would affect the functionality of the inner case coupler 19. In the current embodiment of the present invention, the housing 21 comprises rounded walls 22 and a base section 23. The rounded walls 22 are the particularly formed exterior of the housing 21 that enables the housing 21 to traverse through the opening 6. The rounded walls 22 become coincident with the peripheral portion of the flange 7 and the beveled edge. The base section 23 of the housing 21 allows the housing 21 to be integrally coupled to the tab 20. The base section 23 is found positioned perpendicular to the rounded walls 22.

Referencing FIG. 7-11, the first coupler 24 and the second coupler 25 are the operative components that secure the inner case coupler 19 to the case mount 5. The first coupler 24 and the second coupler 25 traverse into the housing 21. The first coupler 24 and the second coupler 25 are symmetrically positioned with the housing 21. The symmetrical positioning provides that the first coupler 24 is positioned in a mirrored configuration to the positioning of the second coupler 25. The symmetrical positioning between the first coupler 24 and the second coupler 25 allows the components to function cooperatively with one another while they engage the flange 7 and the beveled rim 9. The first coupler 24 and the second coupler 25 are compressibly positioned to the housing 21 where the first coupler 24 and the second coupler 25 can be manipulated to move towards the interior of the housing 21, the compressible relation allows the first coupler 24 and the second coupler 25 to traverse the opening 6 and disengage the flange 7 and the beveled rim 9 of the case mount 5.

Referencing FIG. 7-11, the first coupler 24 and the second coupler 25 each comprise a notch 26, a curved surface 27, a lip 28, a beveled top 29, and a finger mount 30. The notch 26 is a protrusion that coincidentally engages a notch mount 8 of the at least two notch mounts 8. The curved surface 27 is a peripheral wall whose curvatures align co-radially with the curvature of the rounded wall providing a generally flush engagement with the lateral portion of the flange 7 and the lateral portion of the beveled rim 9. The beveled top 29 is a structure with sloped feature that facilitates the traversal past the beveled rim 9 and the flange 7. The lip 28 is positioned between the beveled top 29 and the curved surface 27. The lip 28 extends perpendicularly to the curved surface 27. The lip 28 is retained against the flange 7 while the inner case coupler 19 is engaged to the case mount 5. The finger mount 30 is provided as a specific user engageable feature that enables a user to manipulate the both the first coupler 24 and the second coupler 25.

Referencing FIG. 7-11, the curved surface 27 of the first coupler 24 and the curved surface 27 of the second coupler 25 become operatively aligned with the rounded walls 22 of the housing 21. The operative alignment is a co-radial relationship with the curvature of the rounded walls 22. the co-radial relationship permits the curved surface 27 of the first coupler 24 and the curved surface 27 of the second coupler 25 to cooperatively form a ring link area that become coincident with the lateral portion of the flange 7 and the beveled rim 9. The curved surface 27 is elastically retained against the base section 23. The elastic retention of the curved surface 27 to the base section 23 provides the particular position for the curved surface 27 with the rounded walls 22. The elastic retention enables the compressible movement of the first coupler 24 and the second coupler 25 resulting in the disengagement of the lip 28 with the flange 7. The curved surface 27 is positioned perpendicular to the base section 23 in order to allow the co-radial relationship with the rounded walls 22, as the rounded walls 22 are also found perpendicularly positioned to the base section 23. The curved surface 27 is elastically retained against the beveled rim 9 and the flange 7. When the case mount 5 is engaged to the inner case coupler 19 the curved surface 27 is found rotatably coincident with the lateral portions of the flange 7 and the beveled rim 9, where the lateral portions of the flange 7 and the beveled rim 9 are the surfaces of both that are immediately adjacent to the opening 6.

Referencing FIG. 7-11, the lip 28 is positioned perpendicularly to the curved surface 27. The positioning of the lip 28 is provided to ensure a coincident engagement with the flange 7. The lip 28 functions as an exterior ridge to the curved surface 27 and as such extends away from the curved surface 27. The lip 28 is positioned between the beveled top 29 and the curved surface 27, where the beveled top 29 is immediately adjacent to the curved surface 27 opposite the beveled top 29. The lip 28 is operatively retained against the flange 7. The operative engagement retains the lip 28 against the flange 7 preventing the inner case coupler 19 from detaching from the case mount 5.

Figure 7:
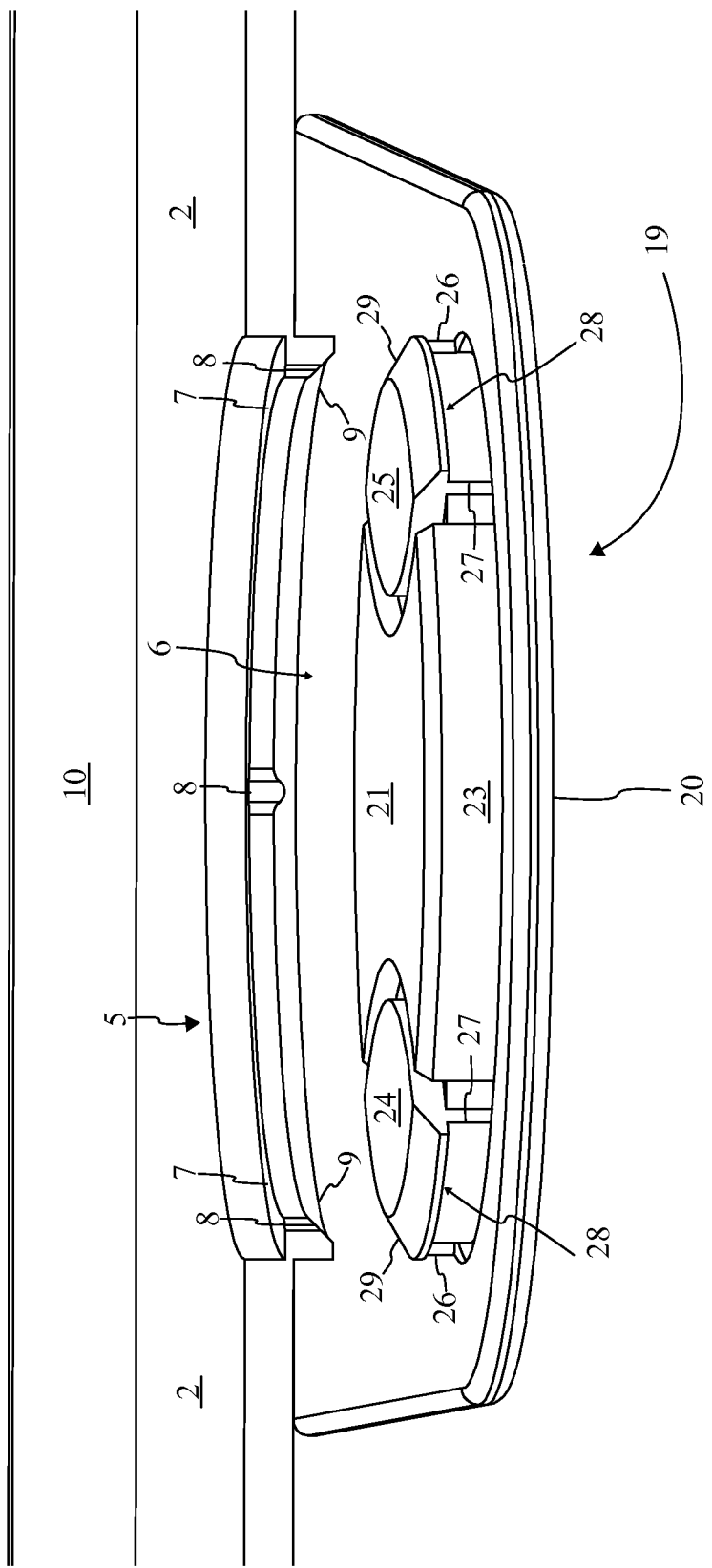
FIG. 7 is an enhanced view displaying the alignment of the case mount with the inner case coupler as per the current embodiment of the present invention.
Figure 8:
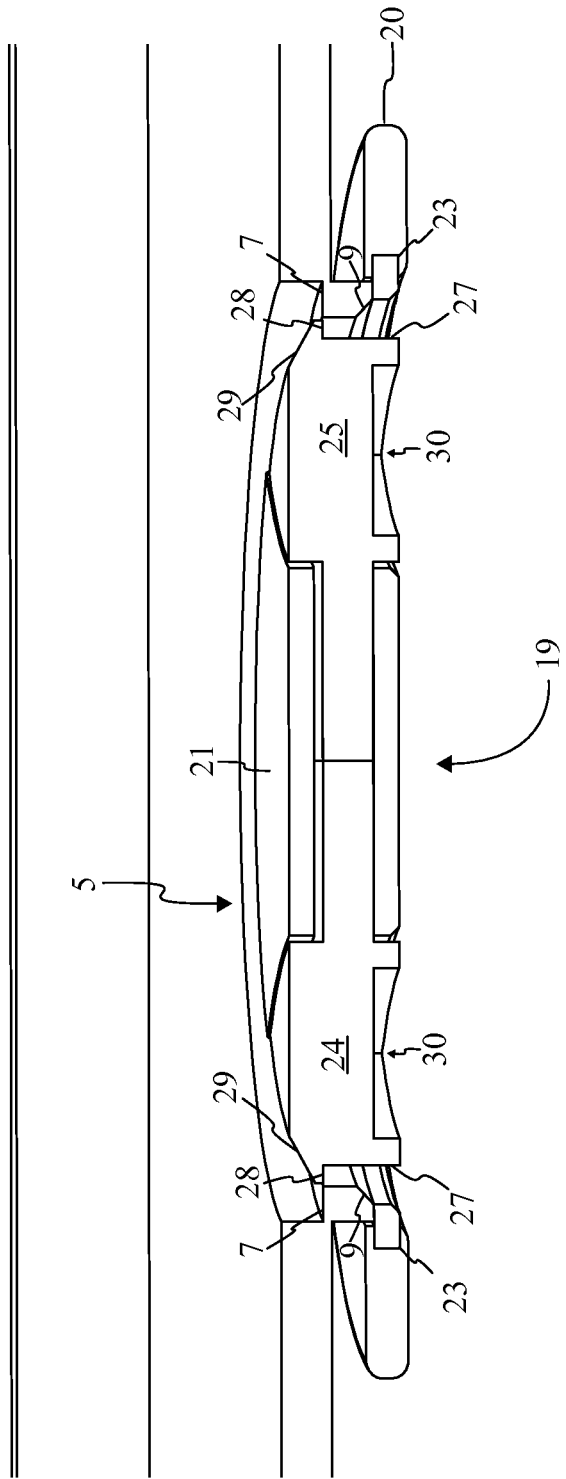
FIG. 8 is an enhanced sectional view displaying the case mount disengaged with the inner case coupler as per the current embodiment of the present invention.
Figure 9:
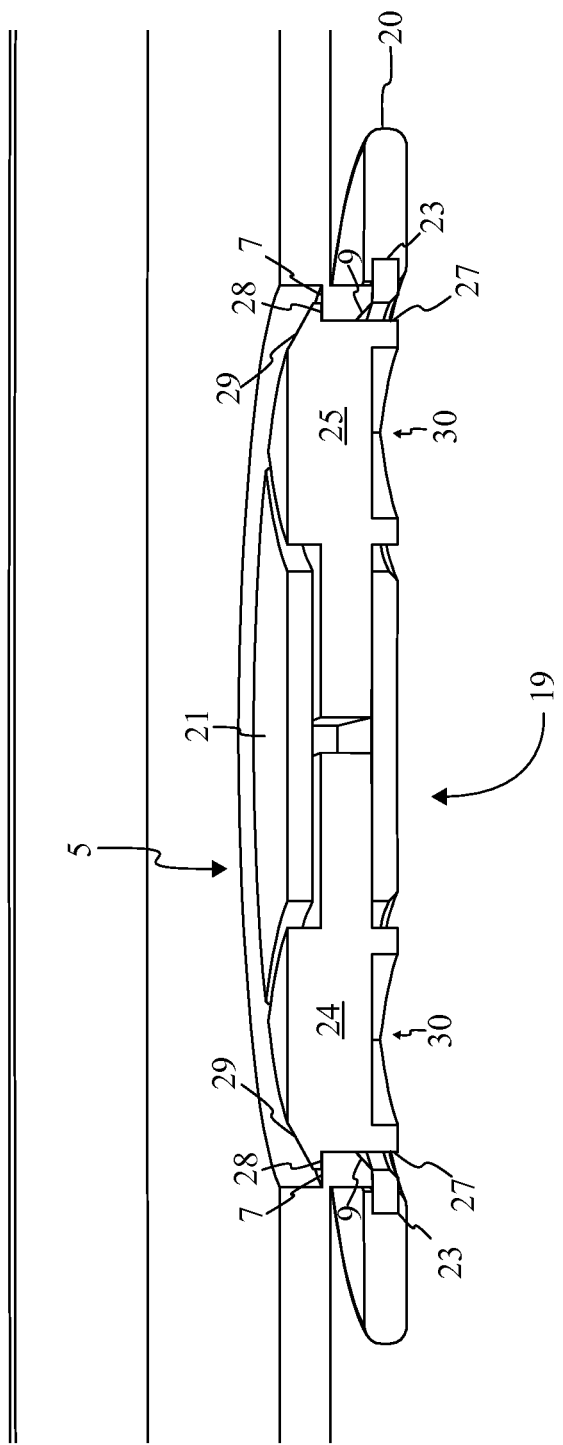
FIG. 9 is an enhanced sectional view displaying the case mount engaged with the inner case coupler as per the current embodiment of the present invention.
Figure 10:
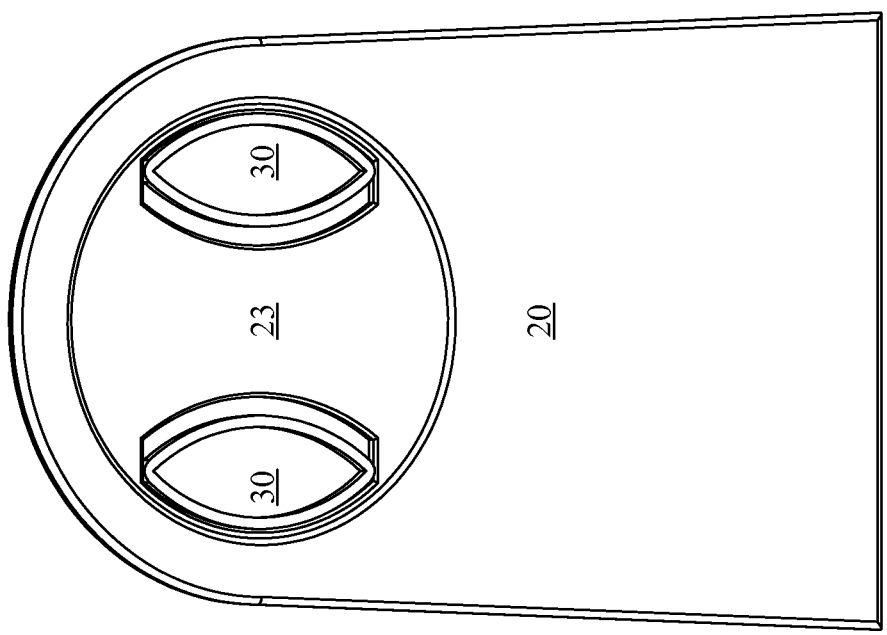
FIG. 10 is a perspective view displaying the positioning of the finger mounts of the first coupler and the second coupler while engaged to the case mount.
Figure 11:
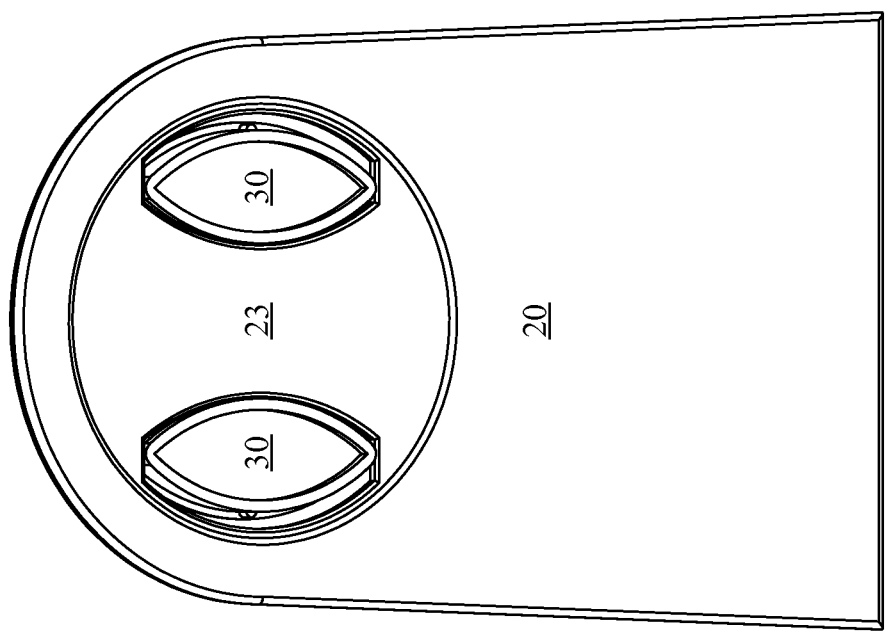
FIG. 11 is a perspective view displaying the positioning of the finger mounts of the first coupler and the second coupler while disengaged to the case mount.
Figure 12:
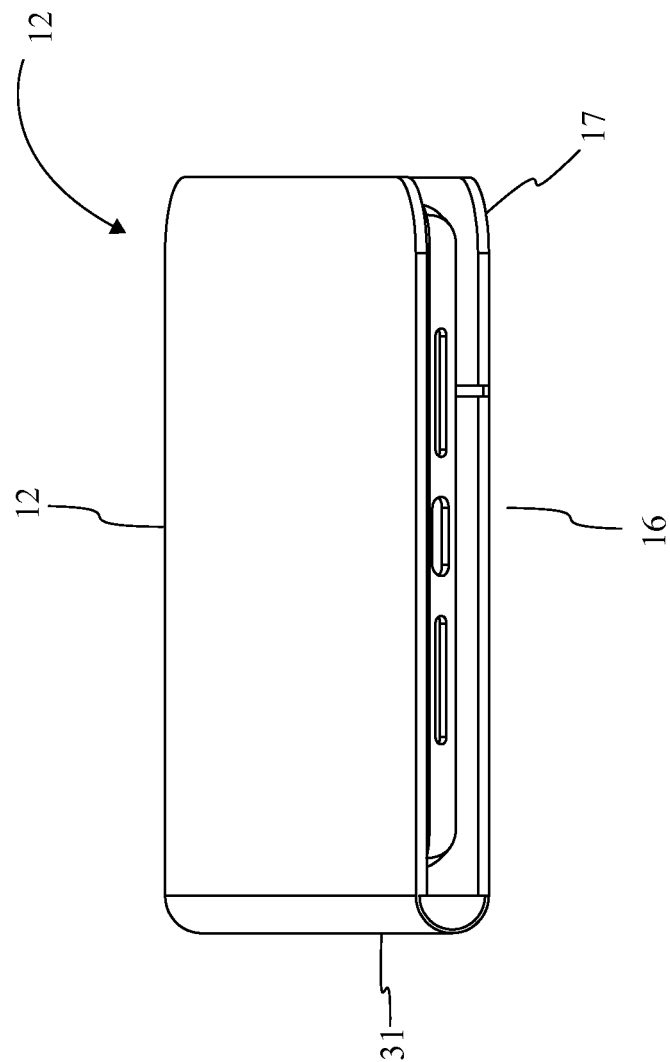
FIG. 12 is a perspective view displaying the mobile device enclosure system in the folding book configuration with the inner case enclosure within the outer case.
Figure 13:
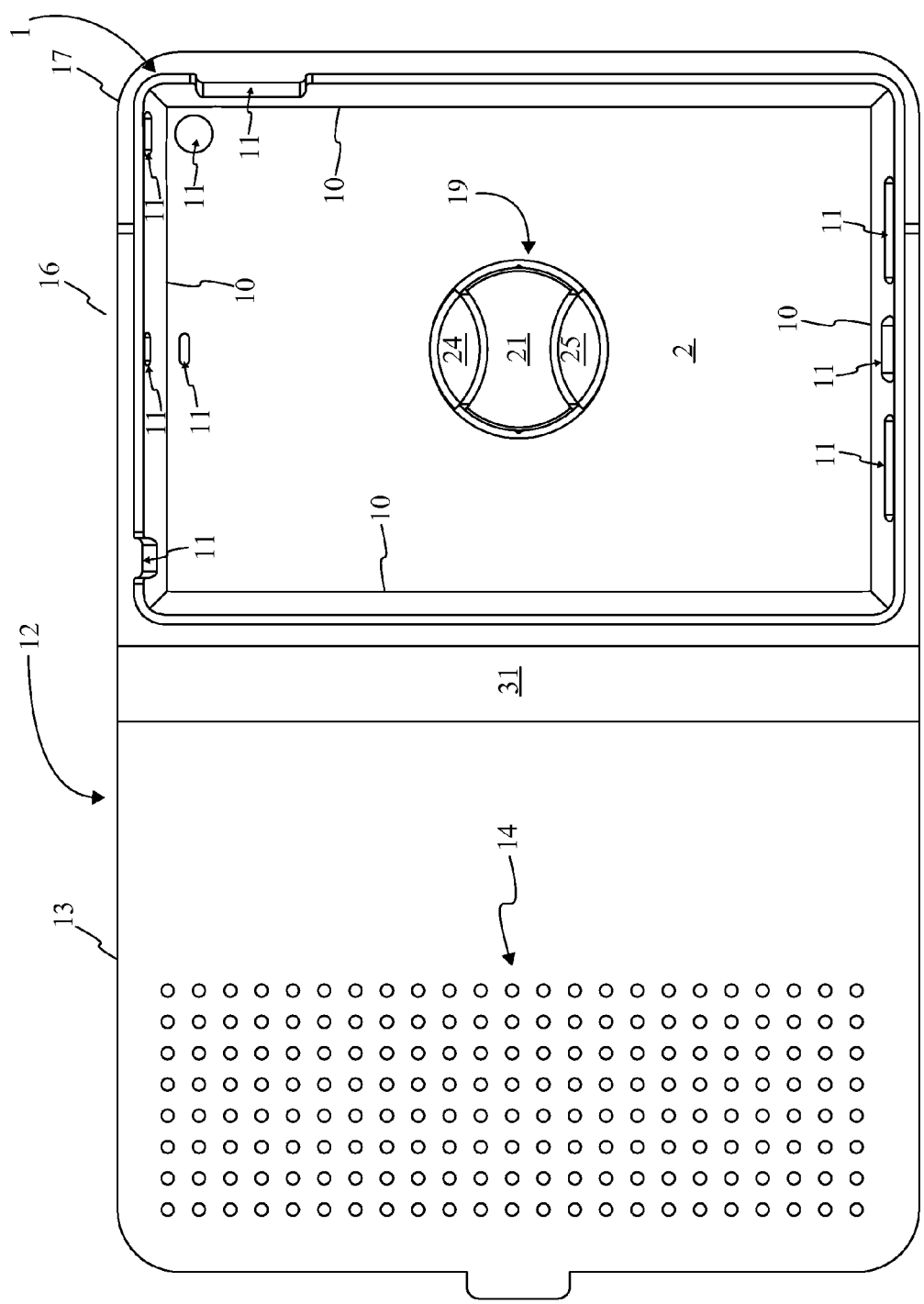
FIG. 13 is a top elevational view displaying the mobile device enclosure system in the folding book configuration with the inner case attached to the outer case.
Figure 14:
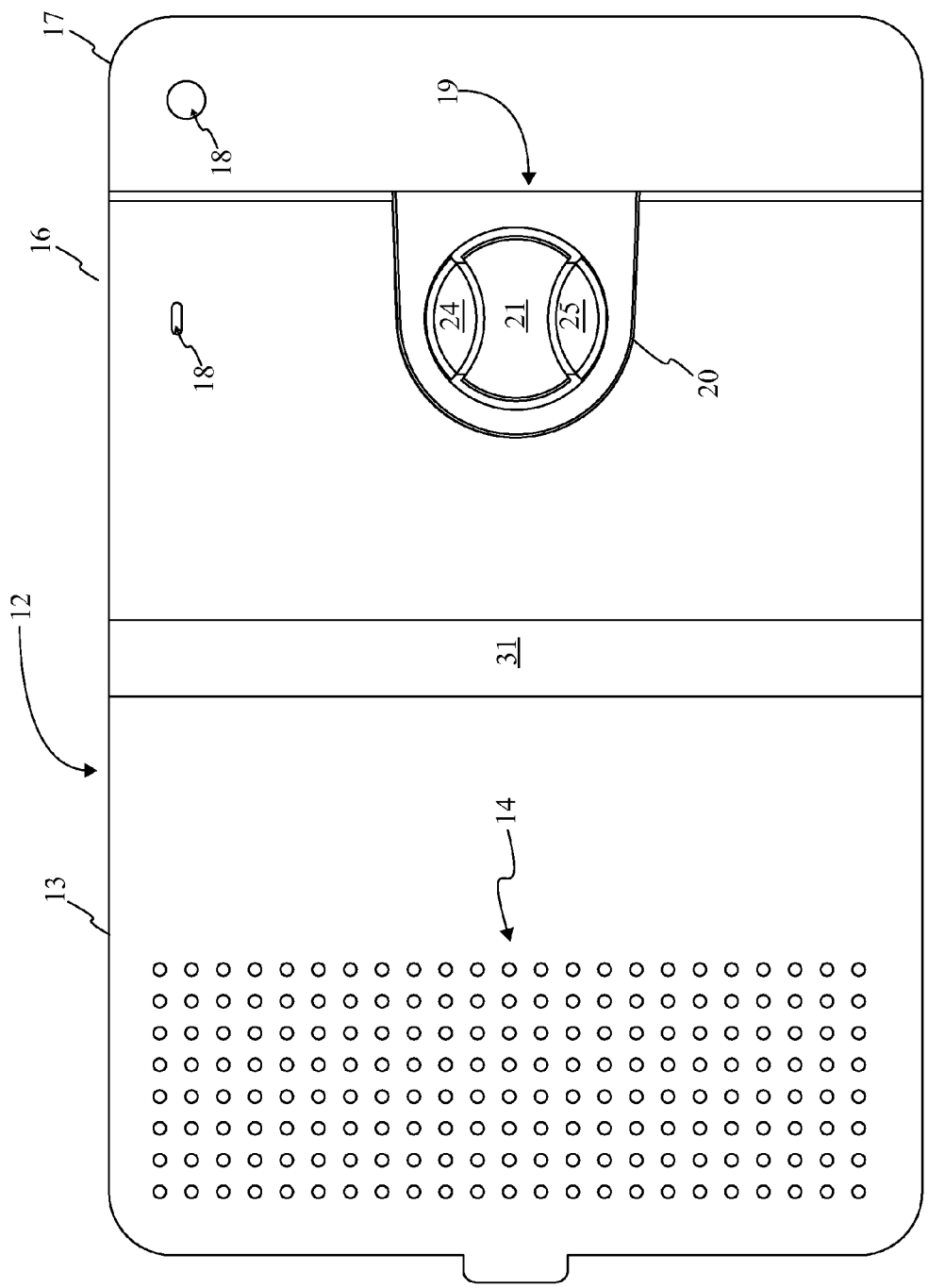
FIG. 14 is a top elevational view displaying the mobile device enclosure system in the folding book configuration without the inner case attached to the outer case.
Figure 15:
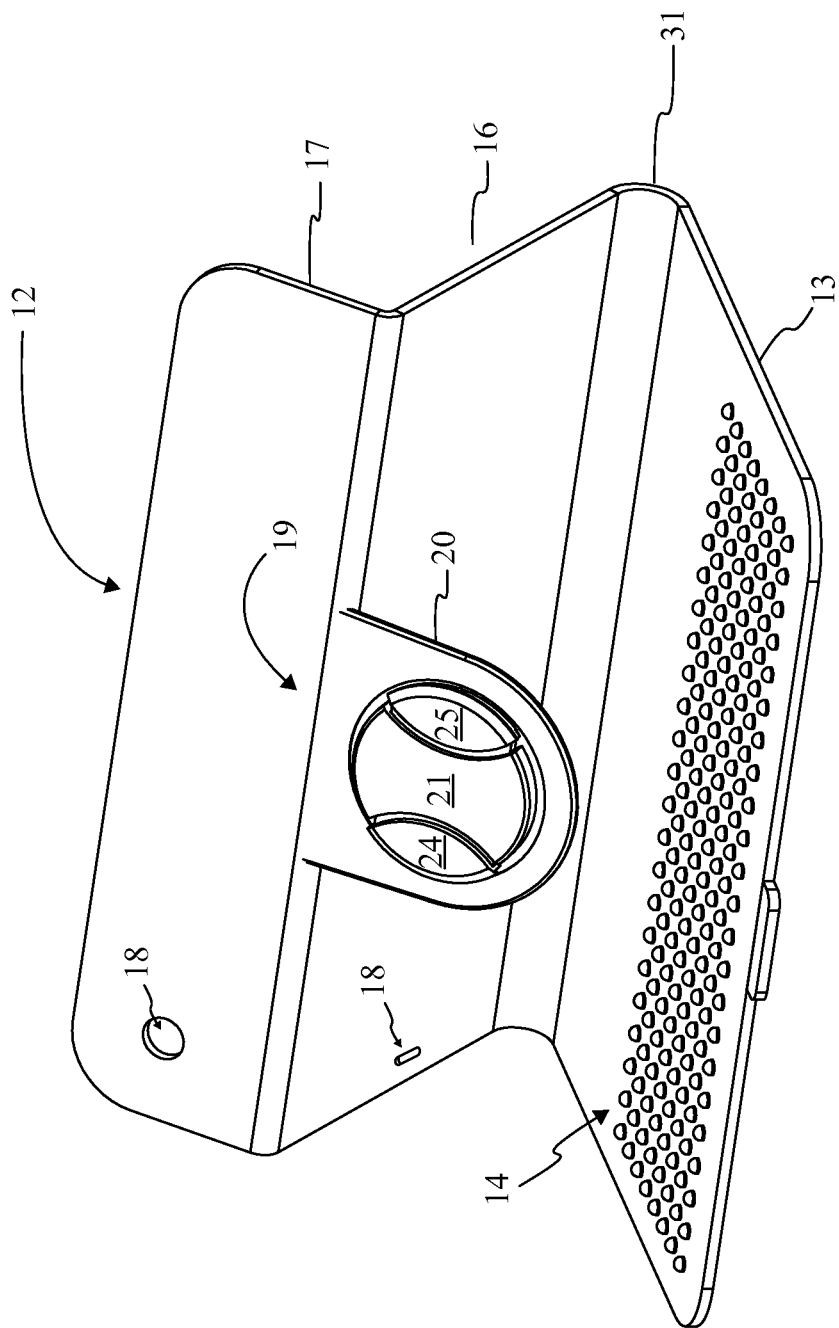
FIG. 15 is a perspective view displaying the mobile device enclosure system in the folding book configuration angled for viewing without the inner case attached to the outer case.
Figure 16:
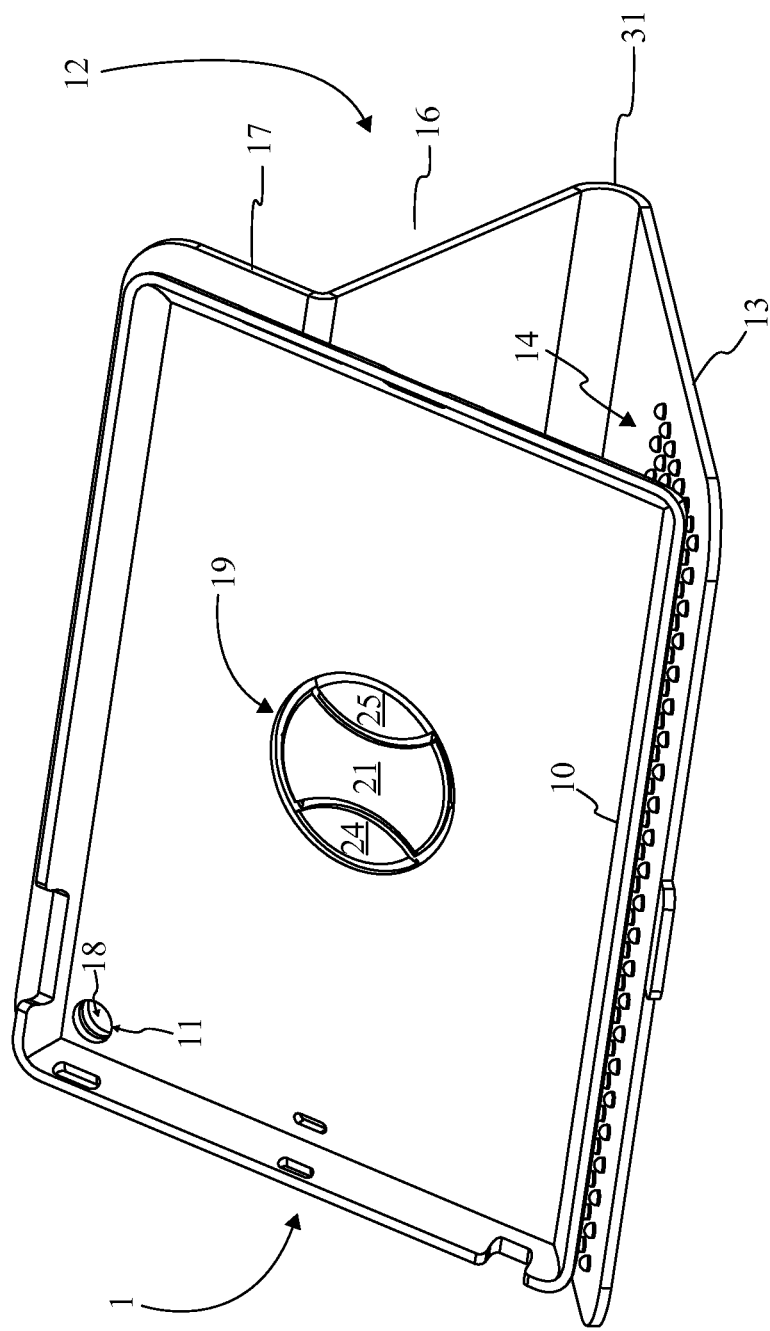
FIG. 16 is a perspective view displaying the mobile device enclosure system in the folding book configuration angled for viewing with the inner case attached in a landscape view.
Figure 17:
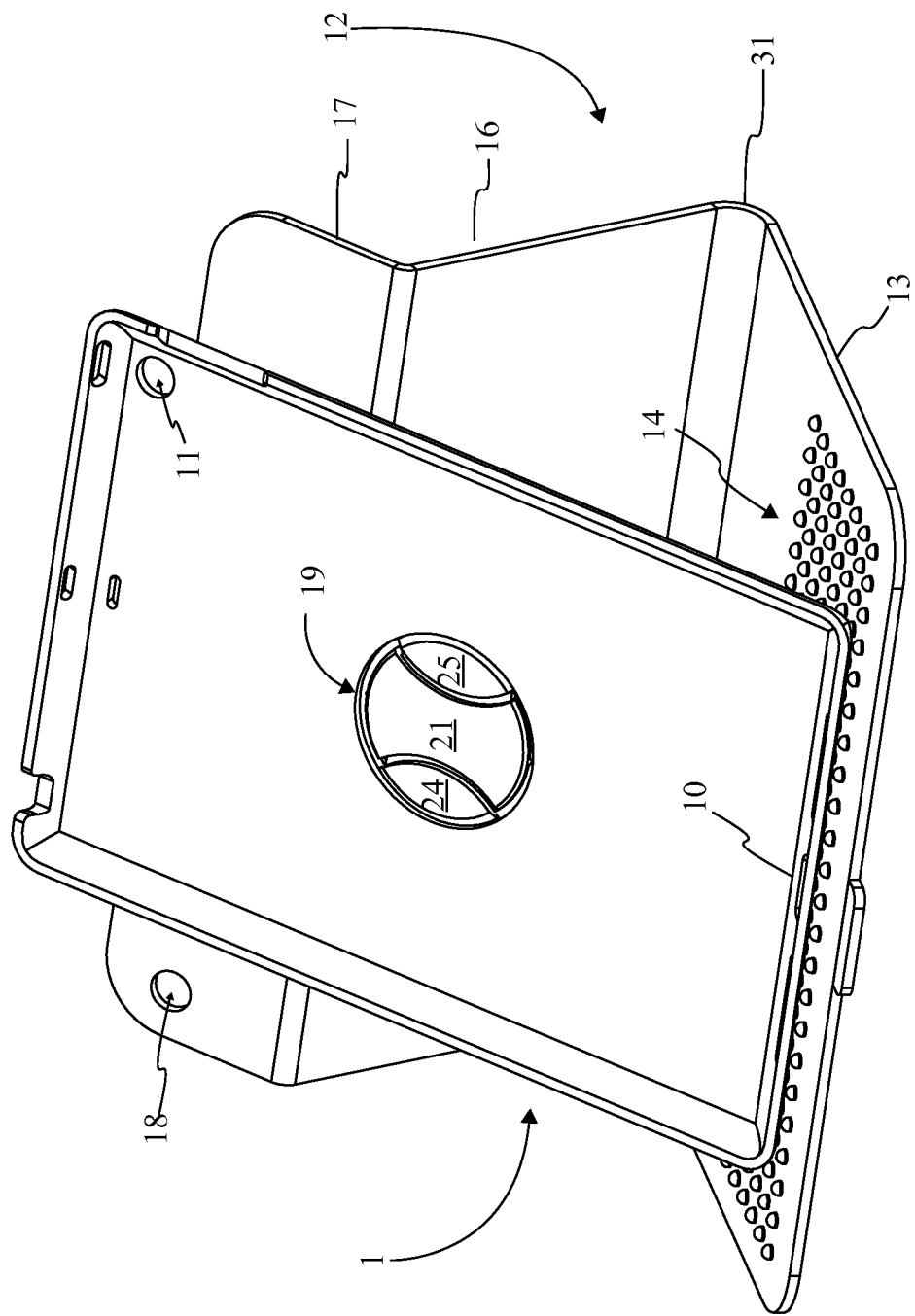
FIG. 17 is a perspective view displaying the mobile device enclosure system in the folding book configuration angled for viewing with the inner case attached in a portrait view.

Referencing FIG. 7-9, the notch 26 is peripherally positioned on the curved surface 27. The notch 26 of the first coupler 24 and the notch 26 of the second coupler 25 are positioned in a manner that results in a symmetrical alignment across the housing 21. The symmetrical alignment ensure that the notch 26 of the first coupler 24 and the notch 26 of the second coupler 25 become coincident with the positioning of the at least two notch mounts 8. the notches 26 are rotatably coincident with the at least two notch mounts 8 where the rotation of the case mount 5 about the inner case coupler 19 provides the notch 26 of the first coupler 24 and the notch 26 of the second coupler 25 becoming coincident with the positioning of the at least two notch mounts 8. The notch 26 is elastically retained against a notch mount 8 of the at least two notch mounts 8. The elastic retention of the notch 26 to the notch mount 8 locks the inner case 1 in a particular orientation that allows the inner case 1 to be particularly positioned in order to facilitate viewing of the media device's display screen.

Referencing FIG. 7-11, the beveled top 29 is the structure positioned immediately adjacent to the lip 28. The beveled top 29 facilitates the traversal past the beveled rim 9 and the flange 7 allowing the lip 28 to become coincident with the flange 7. The beveled top 29 is operatively aligned with the beveled rim 9. The beveled top 29 has a sloped edge that becomes coincident with the beveled rim 9. The sloped edge of the beveled top 29 engages the beveled rim 9 compressing the first coupler 24 and the second coupler 25 towards the interior of the housing 21. The compression of the first coupler 24 and the second coupler 25 allows the housing 21, the first coupler 24, and the second coupler 25 to traverse the opening 6 passing the beveled rim 9 and the flange 7. The beveled rim 9 and the flange 7 are operatively positioned between the lip 28 and the base section 23. The beveled top 29 and the base section 23 retain the lip 28 against the flange 7 providing a secure engagement.

Referencing FIG. 8-11, the finger mount 30 is provided as a specific user engageable feature that enables a user to manipulate the both the first coupler 24 and the second coupler 25. The finger mount 30 is positioned immediately adjacent to the curved surface 27. The finger mount 30 is moveably positioned within the base section 23. The base section 23 contains an excised area that is formed to receive the finger mount 30. The excised area adequately enables the finger mount 30 to move along a set path. The set path coincides with the movement of the first coupler 24 and the second coupler 25 as they are compressed when engaging the case mount 5 or disengaging from the case mount 5.

Figure 18:
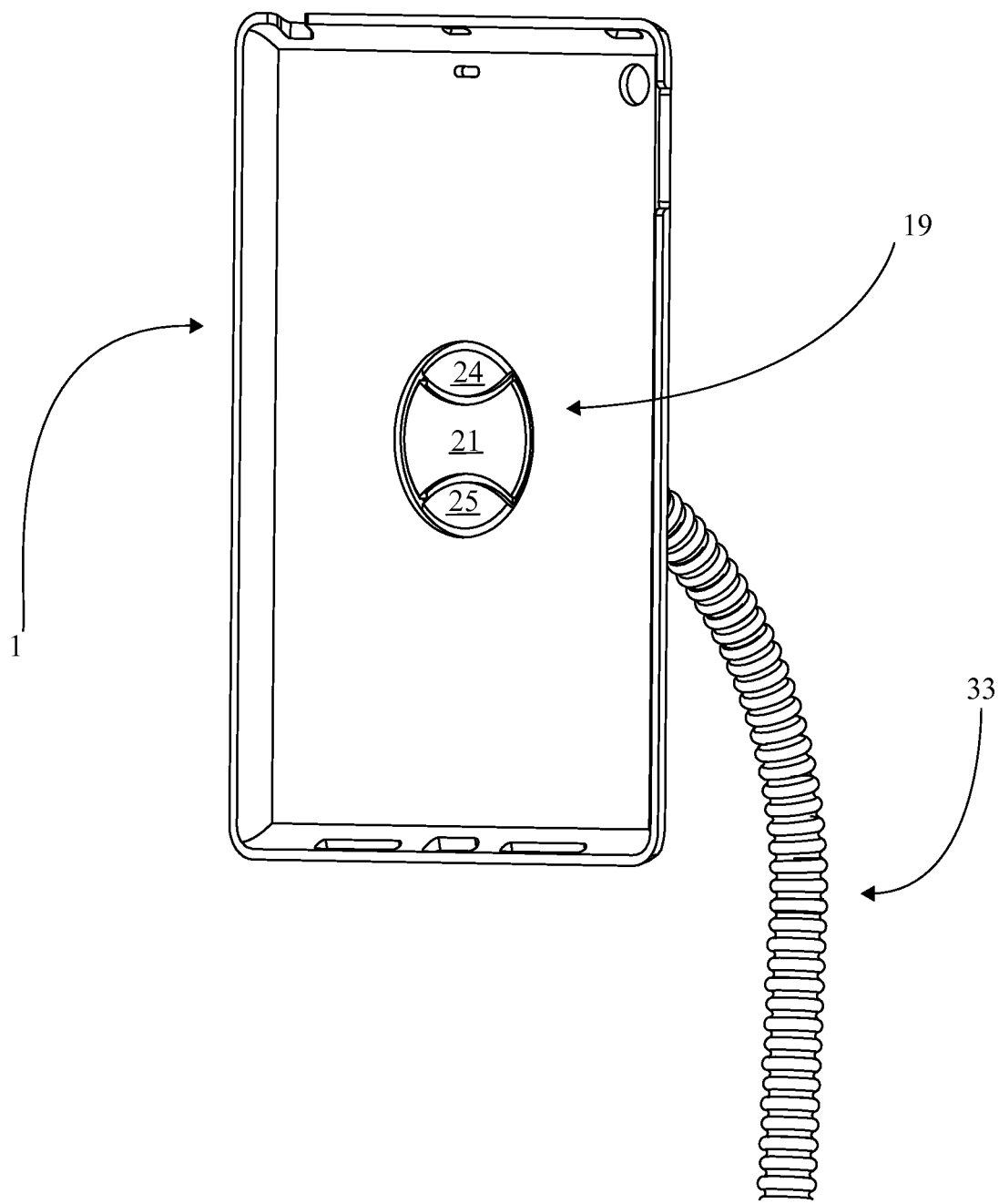
FIG. 18 is a perspective view displaying the inner case detachably and rotatably coupled to a modular mounting system by way of the inner case coupler.

Referencing FIG. 7-9 and FIG. 18, in an embodiment of the present invention, the inner case coupler 19 is provided as part of a modular system for attaching the inner case 1 to a plurality of modular mounting systems 33. In the aforementioned embodiment, the inner case coupler 19 is integrally coupled to the modular mounting system 33. The inner case coupler 19 comprises the housing 21, the first coupler 24, and the second coupler 25 while excluding the tab 20, as the attachment means between the inner case coupler 19 and the modular mounting system 33. The attachment means between the inner case coupler 19 and the modular mounting system 33 can be accomplished by a plurality of means. In FIG. 18, the inner case coupler is coupled to the modular mounting system by way of an integral engagement to the housing 21. It should be noted that the aforementioned embodiment is provided as a one means of providing a modular system for detachably and rotatably securing a mobile device using an inner case 1 and a variation of the inner case coupler 19.

The mobile device enclosure system is a provided as a housing that protects a mobile device for the wear and tear associated with everyday usage without limiting said neither mobile device's portability or the inhibiting access to said mobile devices hardware keys and charging ports. In an embodiment of the invention, the mobile device enclosure comprises an inner sleeve and an outer case. The inner sleeve functions as a primary enclosure that retains the mobile device and protects said mobile device from minor wear and tear. It should be noted that minor wear and tear is used to describe wear and tear to a mobile device that would result in cosmetic damage. The outer case functions as a secondary enclosure which houses the inner sleeve and the mobile device protecting both from major wear and tear as well as accidental damage. It should be noted that major wear and tear and accidental damage is used to describe serious damage to said mobile device requiring repair or replacement of components in order to allow the device to function properly. In order to provide this protection, the inner sleeve is found detachably engaged within the outer case. The detachable engagement between the inner sleeve and the outer case additionally provides a rotatable coupling permitting the mobile device to be particularly arranged in alternative configurations for displaying videos in a landscape, horizontal orientation, or vertical, portrait orientation.

The inner sleeve is provided as the primary enclosure that protects the mobile device from minor wear and tear. In an embodiment of the invention, the inner sleeve comprises a front panel, a rear panel, sidewalls, an inner sleeve opening, a side strap, and a plurality of port openings. The front panel is provided as the portion of the inner sleeve that is coincident with the display screen of a mobile device. The rear panel is provided as the portion of the inner sleeve that is coincident with the rear section of a mobile device. The sidewalls are provided as a flexible member that perimetrically couples the front panel and the rear panel together. The sidewalls juxtaposes the front panel and the rear panel parallel to one another, forming an interstitial space that is appropriately sized for housing a mobile device. The inner sleeve opening is provided as the entrance that permits access to the interstitial space between the front panel and the rear panel. The side strap is provided as a means of securing the mobile device within the interstitial space by spanning the inner sleeve opening and inhibiting the mobile device exiting the inner sleeve. The plurality of port openings are provided as a mean of accessing the mobile devices hardware keys and charging ports, but can additionally allow access to the mobile devices camera lens. The plurality of port openings are found particularly positioned on the front panel, the rear panel, and the sidewalls, wherein the particular positioning of the plurality of port openings is provided in order to enable access to hardware keys, camera lenses, and various ports present on a particular mobile device. The front panel is found juxtaposed parallel to the rear panel. The front panel is flexibly coupled to the rear panel by way of the sidewalls. The inner sleeve opening traverses the sidewalls between the front panel and the rear panel. The side strap is found flexibly coupled to the front panel, wherein the side strap is affixed to the front panel but permitted to flex in order to span across the inner sleeve opening and detachably couple the rear panel. In an embodiment of the invention, the front panel comprises an open viewing area. The open viewing area centrally traverses the front panel. The positioning of the open viewing area to the front panel provides a frame configuration to the front panel when aligned with the display portion of the mobile device.

The rear panel is the portion of the inner sleeve that is coincident with the rear section of the mobile device. In an embodiment of the invention, the rear panel comprises an outer case coupler, a hand strap, and a kickstand. The outer case coupler is a complimenting component to a component on the outer case that enables a detachable and rotatable coupling between inner sleeve and the outer case. The hand strap is provided as an integrated user maniputable engagement that facilitates holding and mobile device while housed within the inner sleeve. The kickstand is an integrated component that is provided as means of inclining the mobile device housed within the inner sleeve in order to function, exclusively, as a touch screen keyboard, wherein deployment of the kickstand angles the mobile device in manner permitting a user's fingers facilitated engagement of the touch screen keys. The outer case coupler is centrally positioned on the rear panel opposite the front panel. The outer case coupler is found positioned between the hand strap and the kickstand. Both the hand strap and the kickstand are positioned flush with the rear panel, wherein both the hand strap and the kickstand do not protrude from the rear panel in their resting state. In an embodiment of the invention, the kickstand comprises a recessed flap and a hinge. The recessed flap is the structural portion of the kickstand that pivots about the hinge becoming perpendicular with the horizontal in order to incline the inner sleeve. The hinge is the portion of the kickstand that permits the hinge to pivot. The hinge is found integrally coupled to the rear panel and the recessed flap. The thing is positioned opposite the outer case coupler across the recessed flap.

The outer case is provided as the secondary enclosure that protects the mobile device housed within the inner sleeve from major wear and tear as well as accidental damage. In an embodiment of the invention, the outer case comprises a first outer flap, a second outer flap, and a sleeve fold. The first outer flap and the second outer flap are provided as functionally similar components that are pivotally coupled to each other through the sleeve fold. The first outer flap and the second outer flap are both rigid padded panels that protect the mobile device from major damage. The sleeve fold is positioned between the first outer flap and the second outer flap. In an embodiment of the invention, the first outer flap, the second outer flap, and the sleeve fold each comprise an interior face side. the interior face side of the first outer flap, the interior face side of the second outer flap, and the interior face side of the sleeve fold are found positioned coincident to each other. The interior face side is the side face of the first outer flap, the second outer flap, and the sleeve fold that is positioned proximal to the inner sleeve. When the inner sleeve is found removeably coupled within the outer case, the interior face side of the first outer flap, the interior face side of the second outer flap and the interior face side of the sleeve fold peripherally surround the inner sleeve. It should be noted that in an embodiment of the invention, the first outer flap and the second outer flap are engage by a peripherally positioned coupler which engages the first outer flap and the second outer flap opposite the positioning of the sleeve fold, in order to provide a more secure enclosure.

The second outer flap is provided as a rigid padded panel that functions in conjunction with the first outer panel and the sleeve fold in order to protect the mobile device enclosed within the inner sleeve. In an embodiment of the invention, the interior face side of the second outer flap comprises an inner sleeve mount. The inner sleeve mount is an engageable flap that pivotably coupled to the interior face side of the second outer flap. The inner sleeve mount is a complimenting component to the outer case coupler on the rear panel. The engagement between the outer case coupler and the inner sleeve mount enables a detachable and rotatable coupling between the rear panel and the interior face side of the second outer flap. While the engagement mechanism of the outer case coupler and the inner sleeve mount are not explicitly described, it should be noted that both the outer case coupler and the inner sleeve mount could be provided as any engagement mechanism that detachably and rotatably couples the inner sleeve to the outer case. In the preferred embodiment of the invention the outer case coupler and the inner sleeve mount are buckle fasteners.

In an embodiment of the invention, the interior face side of the first outer flap comprises a plurality of accessory pockets. The plurality of accessory pocket function as a convenient storage location for accessories of the mobile device as well as an alternative storage location for anything the user wishes to store. In an embodiment of the invention, the interior face side of the sleeve fold comprises an accessory mount. The accessory mount functions as an attachment point for storing a stylus or another kind of cylindrical accessory.

In an embodiment of the invention, the first outer flap may additionally comprise a sleep mode activator. The sleep mode activator would provide the present invention with a means of putting the mobile device in sleep mode when the device is positioned within the outer case. The sleep mode activator would be internally positioned within the first outer flap and would activate sleep mode on a mobile device when the first outer flap becomes parallel with the second outer flap.

The present invention is a mobile device enclosure system designed to protect mobile devices such as tablet computers, tablet PC, or any other tablet type electronic device including but not limited to various generations Apple iPad, Amazon Kindle, Nook, Acer Iconia Tab Tablet, Samsung Galaxy, Asus Transformer Pad, Lenovo IdeaPad K1, Lenovo ThinkPad 1838, LG G-Slate 8.9, Motorola DROID, Sony S1, and etc.

The present invention protects the mobile device from damages and scratches by encasing the mobile devices in a protective case. The mobile device enclosure system acts as an impact absorber and prevents internal damage to the electronics of the mobile device. This is due to the fact that electronic components of a mobile device, may fail if they are subjected to heavy vibrations or sudden impulses.

The present invention comprises an outer case and an inner sleeve. The inner sleeve receives the mobile device. The present invention may utilize a plurality of Velcro strips, a plurality of magnets, and a plurality of grooves on the inside of the outer case, a zipper, a plurality of holders, and a stand on the back of the inner sleeve. The present invention may have a logo that is preferably stamped on the outer case, although any desired printing method may be used.

The present invention is preferably constructed using genuine cowhide leather on the outside of the outer case, although any desired material may be used. The interior face side of the outer case and the interior portion of the inner sleeve are constructed of micro suede, although any desired material may be used. The micro suede material provides a smooth and soft cushion for the mobile device. The present invention utilizes a rigid internal material to create a structurally strong outer case and inner sleeve. The cowhide and micro suede are preferably stitched together and sandwich the rigid internal material in the middle to create a sturdy shape, although any desired means of attachment may be used.

The outer case and the inner sleeve comprise a plurality of port openings that are strategically placed in conjunction with cameras, light sensors, and other ports on each specific mobile device. These ports include but are not limited to charging ports, headphone jacks, speaker ports, and etc. The plurality of port openings allow the user to still utilize the camera and other ports on the mobile device without having to remove the inner sleeve and outer case. The sleeve fold also comprises an accessory mount on the right flap to allow the user to attach and store a stylus or a pen.

In an additional embodiment of the invention comprises a built in stand features would be provided on the outer case in order to allow the user to view the mobile device in multiple angles. The first outer flap would comprise a plurality of grooves on the interior face side that would permit the orientation of the mobile device into a plurality of different viewing angles.

In an additional embodiment of the invention, a large strip of Velcro would be sewn into the interior face side of the second outer flap to attach the inner sleeve in a landscape and/or a portrait view. The inner sleeve rests on the grooves to provide a wide variety of viewing angles for the user. The different viewing angles may be adjusted by moving the inner sleeve forwards or backwards along a groove plate until an edge of the inner sleeve falls into one of the groove.

In an additional embodiment of the invention, the interior face side of the second outer flap would comprises a fold positioned below the large strip of Velcro to convert the outer case into a stand. The fold comprises stitching along the groove to provide a solid hold and prevents separation.

In an additional embodiment of the invention, the second outer flap would comprise a plurality of folds permitting it to bends in the middle. The second outer flap would be able to wrap around the back to create a folded down flat configuration for the user to view and use the mobile device.

In an additional embodiment of the invention, the inner sleeve is constructed of genuine cowhide leather, although any desired material may be used. The interior portion of the inner sleeve is lined with soft felt material to avoid scratching the device. The rear panel of the inner sleeve is lined with the same felt material to attach and detach from outer case for handheld operation and to manipulate the tablet in a portrait and/or a landscape view.

in an additional embodiment of the invention, the inner sleeve comprises a sewn on leather flap that holds a strip of Velcro hook and a Velcro loop sewn on the interior portion of the inner sleeve in order to secure the tablet while inside sleeve.

In an additional embodiment of the invention, a plurality of magnets are positioned underneath the suede like material on the peripheral edges of the first outer flap and the second outer flap. The magnetic flap closure would able to secure mobile device within the outer case. The magnetic flap closure may also automatically sleeps and wakes the new iPad 2 and iPad 3 devices.

In an alternative embodiment of the invention, the an outer case would utilize a dual zipper for easy access, a detachable inner sleeve for handheld operation, a plurality of slots with accessory flaps, and a rear stand for comfortable viewing at a 45° degree angle. In the alternative embodiment of the invention, a large strip of Velcro would be sewn into the interior face side of second outer flap. The large strip of Velcro would be used to attach the inner sleeve case in landscape and/or portrait views. In the alternative embodiment of the invention, the outer case comprises a decorative stitching pattern to give the case a unique and attractive look.

In an alternative embodiment of the invention, the center portion of the outer case comprises a sleeve fold that bends in the middle to close the case. Along with the sleeve fold, the alternative embodiment comprises a dual zipper that secures the case and prevents any accidental separation.

In an alternative embodiment of the invention, the outer case comprises a rear stand that is attached on the exterior side face of the second outer flap to allow a 45° degree viewing angle. The rear stand comprises a strap that prevents the stand from separating from the case. The rear stand also comprises a plurality of magnets that are attached in the stand and the case to hold the stand in a flat configuration when the stand is not in use.

In an alternative embodiment of the invention, the inner sleeve comprises a sewn on leather flap in order secure the mobile device while stored in the inner sleeve. The inner sleeve utilizes a plurality of port openings that are purposefully placed in combination with cameras ports, light sensors, and other ports on each specific electronic device.

Although the invention has been explained in relation to its preferred embodiment, it is to be understood that many other possible modifications and variations can be made without departing from the spirit and scope of the invention as hereinafter claimed.

What is claimed is:

1. A mobile device enclosure system comprises:
an inner case;
an outer case;
an inner case coupler;
the inner case comprises a rear panel, a case mount, sidewalls, and a plurality of port openings;
the outer case comprises a first flap, a second flap, and a folding region;
the case mount comprises an opening, a flange, at least two notch mounts, and a beveled rim;
the inner case coupler comprises a housing, a first coupler, and a second coupler;
the housing comprises rounded walls and a base section;
both the first coupler and the second coupler each comprise a notch, a curved surface, a lip, a beveled top, and a finger mount;
the inner case being rotatably and detachably coupled to the inner case coupler;
the plurality of port opening being particularly positioned on the rear panel and the sidewalls;
the sidewalls being perimetrically positioned to the rear panel;
the sidewalls being extended generally perpendicular to the rear panel;
the case mount being centrally positioned on the rear panel;
the opening traverses centrally through the rear panel;
the flange and the beveled rim being centrally aligned with the opening;
the flange being peripherally positioned around the opening, wherein the flange extend centrally into the opening;
the flange being positioned immediately adjacent to the beveled rim, wherein the beveled rim protrudes from the flange;
the at least two notch mounts traverse the flange and the beveled rim;
each of the at least two notch mounts being oppositely positioned across the opening;
the folding region being positioned between the first flap and the second flap;
the first flap being pivotally coupled to the second flap by way of the folding region;
the first coupler and the second coupler traverse into the housing, wherein the first coupler and the second coupler being compressibly positioned between the rounded walls;
the first coupler being symmetrically positioned to the second coupler across the housing;
the rounded walls being perpendicularly positioned to the base section;
the inner case coupler being pivotably coupled to the second flap;
the case mount being detachably and rotatably engaged to the inner case coupler; and
the inner case being peripherally surrounded by the first flap, the folding region, and the second flap.

2. The mobile device enclosure system as claimed in claim 1 comprises:
the rounded walls and the curved surface of the first coupler and the curved surface of the second coupler being operatively aligned, wherein the operative alignment creates a partially co-radial relation between the curved surface of the first coupler and the second coupler with the rounded walls of the housing;

the curved surface being elastically retained against the base section, wherein the curved surface being positioned perpendicular to the base section;

the base section being traversed by the finger mount;

the finger mount being moveably positioned within the base section;

the lip being positioned immediately adjacent to the curved surface opposite the finger mount;

the lip being perpendicularly to the curved surface, wherein the lip extends away from the curved surface;

the beveled top being positioned immediately adjacent to the lip, opposite the curved surface; and the notch being peripherally positioned on the curved surface, wherein the notch of the first coupler and the notch of the second coupler being symmetrically aligned across the housing.

3. The mobile device enclosure system as claimed in claim 1 comprises:

the beveled top being operatively aligned with the beveled rim, wherein the beveled top compressibly traverses the beveled rim;

the rounded walls, the curved surface of the first coupler and the rounded wall of the second coupler being rotatably coincident with the flange and the beveled rim;

the beveled rim and the flange being operatively positioned between the lip and the base section;

the curved surface being elastically retained against the flange and the beveled rim;

the lip being operatively retained against the flange;

the notch being rotatably coincident with the least two notch mounts; and the notch being elastically retained against a notch mount of the at least two notch mounts.

4. The mobile device enclosure system as claimed in claim 1 comprises:

the rear panel comprises at least one kickstand and a hand strap;

the case mount being positioned between the hand strap and at least one the kickstand; and the at least one kickstand being pivotably coupled to the rear panel.

5. The mobile device enclosure system as claimed in claim 1, wherein the first flap comprises a plurality of accessory pockets.

6. The mobile device enclosure system as claimed in claim 1, wherein the outer case comprises a plurality of accessory mounts.

7. The mobile device enclosure system as claimed in claim 1, wherein the outer case comprises accessory openings, where the accessory openings being coincidentally aligned with port openings of the plurality of port openings.

8. The mobile device enclosure system as claimed in claim 1, wherein the inner case being engaged to a plurality of modular mounting system by way of the inner case coupler.

9. The mobile device enclosure system as claimed in claim 1 comprises:

the inner case coupler comprises a tab;

the tab being pivotably coupled to the second flap distal to the folding region;

the housing being integrally coupled to the tab by way of the base section; and the rounded walls being perpendicularly positioned to the tab.

10. The mobile device enclosure system as claimed in claim 8 comprises:

the second flap comprises a folding panel;

the folding panel being positioned opposite the folding region across the second flap;

the tab being coupled coplanar with the folding panel; and the tab being pivotably coupled to the second flap by way of the folding panel.

11. The mobile device enclosure system as claimed in claim 1, wherein the first flap comprises an inner case retainer, where the inner case retainer being coincidentally positioned with the sidewalls of the inner case.

12. A mobile device enclosure system comprises:

an inner case;

an outer case;

an inner case coupler;

the inner case comprises a rear panel, a case mount, sidewalls, and a plurality of port openings;

the outer case comprises a first flap, a second flap, and a folding region;

the rear panel comprises at least one kickstand and a hand strap;

the case mount comprises an opening, a flange, at least two notch mounts, and a beveled rim;

the inner case coupler comprises a housing, a first coupler, and a second coupler;

the housing comprises rounded walls and a base section;

both the first coupler and the second coupler each comprise a notch, a curved surface, a lip, a beveled top, and a finger mount;

the inner case being rotatably and detachably coupled to the inner case coupler;

the case mount being positioned between the hand strap and at least one the kickstand;

the at least one kickstand being pivotably coupled to the rear panel;

the plurality of port opening being particularly positioned on the rear panel and the sidewalls;

the sidewalls being perimetrically positioned to the rear panel;

the sidewalls being extended generally perpendicular to the rear panel;

the case mount being centrally positioned on the rear panel;

the opening traverses centrally through the rear panel;

the flange and the beveled rim being centrally aligned with the opening;

the flange being peripherally positioned around the opening, wherein the flange extend centrally into the opening;

the flange being positioned immediately adjacent to the beveled rim, wherein the beveled rim protrudes from the flange;

the at least two notch mounts traverse the flange and the beveled rim;

each of the at least two notch mounts being oppositely positioned across the opening;

the folding region being positioned between the first flap and the second flap;

the first flap being pivotably coupled to the second flap by way of the folding region;

the first coupler and the second coupler traverse into the housing, wherein the first coupler and the second coupler being compressibly positioned between the rounded walls;

the first coupler being symmetrically positioned to the second coupler across the housing;

the rounded walls being perpendicularly positioned to the base section;

the inner case coupler being pivotably coupled to the second flap;

the case mount being detachably and rotatably engaged to the inner case coupler;

the inner case being peripherally surrounded by the first flap, the folding region, and the second flap;

the rounded walls and the curved surface of the first coupler and the curved surface of the second coupler being operatively aligned, wherein the operative alignment creates a partially co-radial relation between the curved surface of the first coupler and the second coupler with the rounded walls of the housing;

the curved surface being elastically retained against the base section, wherein the curved surface being positioned perpendicular to the base section;

the base section being traversed by the finger mount;

the finger mount being moveably positioned within the base section;

the lip being positioned immediately adjacent to the curved surface opposite the finger mount;

the lip being perpendicularly to the curved surface, wherein the lip extends away from the curved surface;

the beveled top being positioned immediately adjacent to the lip, opposite the curved surface;

the notch being peripherally positioned on the curved surface, wherein the notch of the first coupler and the notch of the second coupler being symmetrically aligned across the housing;

the beveled top being operatively aligned with the beveled rim, wherein the beveled top compressibly traverses the beveled rim;

the rounded walls, the curved surface of the first coupler and the rounded wall of the second coupler being rotatably coincident with the flange and the beveled rim;

the beveled rim and the flange being operatively positioned between the lip and the base section;

the curved surface being elastically retained against the flange and the beveled rim;

the lip being operatively retained against the flange;

the notch being rotatably coincident with the least two notch mounts; and the notch being elastically retained against a notch mount of the at least two notch mounts.

13. The mobile device enclosure system as claimed in claim 12, wherein the first flap comprises a plurality of accessory pockets.

14. The mobile device enclosure system as claimed in claim 12, wherein the outer case comprises a plurality of accessory mounts.

15. The mobile device enclosure system as claimed in claim 12, wherein the outer case comprises accessory openings, where the accessory openings being coincidentally aligned with port openings of the plurality of port openings.

16. The mobile device enclosure system as claimed in claim 12, wherein the inner case being engaged to a plurality of modular mounting system by way of the inner case coupler.

17. The mobile device enclosure system as claimed in claim 12 comprises:

the inner case coupler comprises a tab;

the tab being pivotably coupled to the second flap distal to the folding region;

the housing being integrally coupled to the tab by way of the base section;

the rounded walls being perpendicularly positioned to the tab; and the folding panel being positioned opposite the folding region across the second flap.

18. The mobile device enclosure system as claimed in claim 17 comprises:

the second flap comprises a folding panel;

the first flap comprises an inner case retainer;

the tab being coupled coplanar with the folding panel;

the tab being pivotably coupled to the second flap by way of the folding panel; and the inner case retainer being coincidentally positioned with the sidewalls of the inner case.

\* \* \* \* \*